(12) United States Patent
Haggquist

(10) Patent No.: US 12,516,448 B2
(45) Date of Patent: Jan. 6, 2026

(54) FUNCTIONAL TEXTILES AND MANUFACTURING METHODS

(71) Applicant: Cocona, Inc., Boulder, CO (US)

(72) Inventor: Gregory W. Haggquist, Longmont, CO (US)

( * ) Notice: Subject to any disclaimer, the term of this patent is extended or adjusted under 35 U.S.C. 154(b) by 925 days.

(21) Appl. No.: 17/035,291

(22) Filed: Sep. 28, 2020

(65) Prior Publication Data

US 2021/0095396 A1 Apr. 1, 2021

Related U.S. Application Data

(60) Provisional application No. 62/906,717, filed on Sep. 27, 2019.

(51) Int. Cl.

| | |
|---|---|
| *B01J 20/28* | (2006.01) |
| *B01J 20/18* | (2006.01) |
| *B01J 20/26* | (2006.01) |
| *B01J 20/30* | (2006.01) |
| *B29C 48/00* | (2019.01) |
| *B29C 48/05* | (2019.01) |
| *B29C 48/25* | (2019.01) |
| *D01D 1/02* | (2006.01) |

(Continued)

(52) U.S. Cl.
CPC ............... *D01F 2/24* (2013.01); *B01J 20/18* (2013.01); *B01J 20/262* (2013.01); *B01J 20/28004* (2013.01); *B01J 20/28028* (2013.01); *B01J 20/3007* (2013.01); *B01J 20/305* (2013.01); *B29C 48/022* (2019.02); *B29C 48/05* (2019.02); *B29C 48/25* (2019.02); *D01D 1/02* (2013.01); *D01D 5/06* (2013.01); *D01D 10/00* (2013.01); *B29K 2067/003* (2013.01); *B29K 2509/02* (2013.01); *B29L 2031/731* (2013.01); *D10B 2501/00* (2013.01)

(58) Field of Classification Search
CPC ............... B01J 20/28028; B01J 20/305; B01J 20/3007; B01J 20/18
See application file for complete search history.

(56) References Cited

U.S. PATENT DOCUMENTS

| | | |
|---|---|---|
| 6,177,605 B1 | 1/2001 | Trombetta et al. |
| 6,624,383 B1 | 9/2003 | Lichtenstein et al. |

(Continued)

FOREIGN PATENT DOCUMENTS

| | | |
|---|---|---|
| BR | 112022005702-4 A2 | 6/2022 |
| CN | 114929955 A | 8/2022 |

(Continued)

OTHER PUBLICATIONS

"International Search Report and Written Opinion received for International Application No. PCT/US2020/053133, Search completed on Jan. 13, 2021 mailed on Jan. 13, 2021".

(Continued)

*Primary Examiner* — Binh X Tran
(74) *Attorney, Agent, or Firm* — Kutak Rock LLP; Jason S. Jackson

(57) ABSTRACT

Disclosed are textile fibers, yarns, and fabrics having improved comfort and water and odor adsorption properties, and methods of manufacturing same. The improved textiles have an increased distribution of adsorbing particles distributed at the surface of the fibers and yarns to enable greater overall surface area for adsorbance.

8 Claims, 8 Drawing Sheets

(51) Int. Cl.
- *D01D 5/06* (2006.01)
- *D01D 10/00* (2006.01)
- *D01F 2/24* (2006.01)
- *B29K 67/00* (2006.01)
- *B29K 509/02* (2006.01)
- *B29L 31/00* (2006.01)

(56) References Cited

U.S. PATENT DOCUMENTS

| | | |
|---|---|---|
| 2004/0028900 A1 | 2/2004 | Larsen et al. |
| 2015/0017421 A1* | 1/2015 | Sotzing .................. D06N 3/04 428/323 |
| 2020/0165748 A1* | 5/2020 | Tonosaki ............... D06M 11/13 |

FOREIGN PATENT DOCUMENTS

| | | | | |
|---|---|---|---|---|
| EP | 1186628 A2 | * | 3/2002 | ............. C08G 63/78 |
| EP | 3763777 A1 | * | 1/2021 | ......... B29B 17/0026 |
| EP | 4034699 | | 8/2022 | |
| HK | 40078846 A | | 4/2023 | |
| IN | 202137058190 A | | 6/2022 | |
| JP | S57139520 A | | 8/1982 | |
| JP | H07133586 | * | 5/1995 | |
| JP | H07133586 A | | 5/1995 | |
| JP | H08508970 A | | 9/1996 | |
| JP | 2001355119 A | | 12/2001 | |
| JP | 3301706 B2 | | 7/2002 | |
| JP | 2004162245 A | | 6/2004 | |
| JP | 3800871 B2 | | 7/2006 | |
| JP | 201172994 A | | 4/2011 | |
| JP | 2017512915 A | | 5/2017 | |
| JP | 2022-549336 A | | 11/2022 | |
| KR | 10-2017-0061738 A | | 6/2017 | |
| KR | 20170061738 A | * | 6/2017 | |
| KR | 102018013118 A | | 2/2018 | |
| KR | 10-2019-0030119 A | | 3/2019 | |
| KR | 10-2022-0069990 A | | 5/2022 | |
| TW | 201019975 A | | 6/2010 | |
| TW | 202129099 A | | 8/2021 | |
| TW | 202523929 A | | 6/2025 | |
| WO | 0156930 A1 | | 8/2001 | |
| WO | WO-2011063372 A2 | * | 5/2011 | ............. A61F 13/42 |
| WO | WO-2020005928 A1 | * | 1/2020 | ......... B01D 39/1615 |
| WO | 2021062393 A1 | | 4/2021 | |

OTHER PUBLICATIONS

"International Preliminary Report on Patentability for International Application PCT/US2020/053133, Report issued Mar. 15, 2022, Mailed on Apr. 7, 2022.".

"Office Action Received for Mexico Patent Application No. MX/a/2022/003654, Mailed on Apr. 12, 2022.".

"Examination and Search Report Received for Taiwan Patent Application No. 109133503, mailed on Jan. 17, 2024.".

"Extended European Search Report Received for European Patent Application No. 20867911.8, Search completed on Sep. 29, 2023, Mailed on Oct. 10, 2023.".

"First Office Action Received for China Patent Application No. 202080075994.7, Mailed on Oct. 10, 2023.".

"Notice of Decision to Grant Received for Taiwan Patent Application No. 109133503, mailed on Aug. 29, 2024".

"Office Action Received for Japan Patent Application No. 2022-519063, Mailed On Aug. 26, 2024.".

"Office Action Received for Japan Patent Application No. 2022-519063, Mailed On May 30, 2025.".

"Office Action Received for Taiwan Patent Application No. 113145381, mailed on Jul. 2, 2025".

* cited by examiner

FUNCTIONAL TEXTILES AND MANUFACTURING METHODS

CROSS-REFERENCE TO RELATED APPLICATIONS

This application claims the benefit of U.S. Provisional Application Ser. No. 62/906,717, filed Sep. 27, 2019, the entirety of which is hereby incorporated herein by this reference as if fully set forth herein.

FIELD

The invention relates generally to improving the adsorption capacity of textiles. In particular, the invention relates to textile fibers and methods for processing those fibers to improve their ability to adsorb water and therefore improve water vapor transport characteristics of the fibers.

BACKGROUND

Textile fibers that are doped with functional additives have a limited capacity for water or odor adsorption. After manufacturing, the capacity of the doped textile fabric is not optimal. Therefore, there exists a significant need for manufacturing processes to produce higher capacity fibers and yarns with the same or lower amounts of functional additives.

SUMMARY

Disclosed is the surprising discovery that by reducing the weight of a textile fiber, which is doped with molecule-adsorbing particles, the molecule-adsorbing activity of the treated fiber and overall thermal management of fabric made from these treated fibers improved significantly. This discovery enables the production of improved functional fibers and fabrics as well as significantly lower production costs. Without wishing to be bound by theory, it is believed that the weight reduction process removes a portion of the outer layer of the fiber to expose a greater surface area of molecule-adsorbing particles to the outside environment.

Thus, in one aspect, the invention provides a manufacture that contains a polymer with particles embedded therein, wherein a portion of the surface of the polymer is removed to expose a subset of the particles to the external environment. In one embodiment, the portion of the surface of the polymer that is removed represents 5%-50% by weight of the polymer before removal of the surface portion. In one embodiment, the cross-sectional distribution of particles throughout the manufacture is uniform all the way out to the outer surface of the manufacture. Here, stated otherwise, the manufacture does not have an outer layer, no matter how thin, that does not contain particles. In another embodiment, the density of particles at the outer surface or exposed to the external environment of the manufacture is higher than the density of particles closer to the core. Here, stated otherwise, the manufacture has an outer layer, no matter how thin, that contains a higher density of particles relative to an interior core.

In one embodiment, the particles have a mean surface area of at least about 10 square meters per gram, which enables the adsorption of relatively large amounts of molecules, such as, e.g., water, butane, butyric acid and other odorant molecules, and the like. In one embodiment, the particles can adsorb at least 10% by weight of water. In certain preferred embodiments, the particles are zeolite particles. In some embodiments, other particles, which are not normally associated with molecule adsorption, are also embedded in the polymer, such as, e.g., titanium dioxide ($TiO_2$) particles, which may be included to impart light scattering properties. In certain preferred embodiments, the particles do not contain silver or silver ions, or otherwise stated, the manufacture does not contain any silver, silver ions, or silver-containing compounds.

In one embodiment, the polymer is a synthetic polymer, such as, e.g., a polyester, a nylon, a polyurethane, a polylactic acid, or the like. In another embodiment, the polymer is a natural polymer, such as, e.g., cellulose. Regarding natural polymers, a natural cellulose fiber, such as e.g., cotton, hemp, flax, or the like, and a regenerated cellulose fiber, such as e.g., lyocell, viscose, rayon, or the like, are both considered to contain natural polymers. In some embodiments, the manufacture contains two or more distinct polymers, which may be natural or synthetic, or a combination of natural and synthetic.

In one embodiment, the manufacture is a fiber, such as, e.g., a monofilament fiber, a filament, a staple fiber, or a yarn. In another embodiment, the manufacture is a textile fabric knitted or woven from the fibers. In another embodiment, the manufacture is an article of clothing made from the textile fabric. In one embodiment, the fiber or textile fabric has a greater molecule-adsorption capacity, a greater ability to adsorb water, and/or a greater odor activity value (OAV) than a similar fiber or textile fabric whose outer layer has not been removed.

In another aspect, the invention provides a method of making a fiber by providing a liquid or molten polymer (e.g., as in the case for a synthetic polymer such as a molten or flowable polyester) or a liquid polymer solution (e.g., such as in the case of dissolved cellulose for producing regenerated cellulose fibers), doping the polymer with molecule-adsorbing particles, forming a fiber from the particle-doped polymer, and (d) removing a portion of the surface layer of the fiber to expose a portion of the molecule-adsorbing particles to the outside environment.

In one embodiment, 5%-50% by weight of the polymer or fiber is removed. In another embodiment, 0.25 to 2 microns of the surface of the fiber is removed. Any method now known or yet to be discovered may be used to remove the portion of the surface layer of the fiber, such as, e.g., by traditional textile fiber weight reduction processes. In some embodiments, the surface layer of the fiber is removed by caustic reduction, enzymatic digestion, mercerization, ultraviolet treatment, laser etching, plasma etching, physical shaving such as through a cutting die, or the like.

In one embodiment, as in the previous aspect, the particles have a mean surface area of at least about 10 square meters per gram, which enables the adsorption of relatively large amounts of molecules, such as, e.g., water, butane, butyric acid and other odorant molecules, and the like. In one embodiment, the particles can adsorb at least 10% by weight of water. In certain preferred embodiments, the particles are zeolite particles. In some embodiments, other particles, which are not normally associated with molecule adsorption, are also embedded in the polymer, such as, e.g., titanium dioxide ($TiO_2$) particles, which may be included to impart light scattering properties. In certain preferred embodiments, the particles do not contain silver or silver ions, or otherwise stated, the manufacture does not contain any silver, silver ions, or silver-containing compounds.

In one embodiment, as in the previous aspect, the polymer is a synthetic polymer, such as, e.g., a polyester, a nylon, a polyurethane, a polylactic acid, or the like. In another embodiment, the polymer is a natural polymer, such as, e.g., cellulose. Regarding natural polymers, a natural cellulose fiber, such as e.g., cotton, hemp, flax, or the like, and a regenerated cellulose fiber, such as e.g., lyocell, viscose, rayon, or the like, are both considered to contain natural polymers. In some embodiments, the manufacture contains two or more distinct polymers, which may be natural or synthetic, or a combination of natural and synthetic.

In some embodiments where the polymer is a synthetic polymer (e.g., polyester or other plastic), the fiber is formed by molten extrusion (i.e., melt spinning) of the liquid or molten polymer. In some embodiments where the polymer is a natural polymer (e.g., regenerated cellulose), the fiber is formed by wet or dry spinning the liquid polymer solution.

In another embodiment, the fibers are woven or knitted to form a textile fabric. In yet another embodiment, the textile fabric is fashioned into a garment having improved thermal and odor management properties.

In another aspect, the invention provides a fiber and/or a textile fabric produced by the process described in the preceding aspect, namely by, inter alia, providing a liquid or molten polymer (e.g., as in the case for a synthetic polymer such as a molten or flowable polyester) or a liquid polymer solution (e.g., such as in the case of dissolved cellulose for producing regenerated cellulose fibers), doping the polymer with molecule-adsorbing particles, forming a fiber from the particle-doped polymer, and (d) removing a portion of the surface layer of the fiber to expose a portion of the molecule-adsorbing particles to the outside environment.

In one embodiment, 5%-50% by weight of the polymer or fiber is removed. In another embodiment, 0.25 to 2 microns of the surface of the fiber is removed. Any method now known or yet to be discovered may be used to remove the portion of the surface layer of the fiber, such as, e.g., by traditional textile fiber weight reduction processes. In some embodiments, the surface layer of the fiber is removed by caustic reduction, enzymatic digestion, mercerization, ultraviolet treatment, laser etching, plasma etching, physical shaving such as through a cutting die, or the like.

DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF EMBODIMENTS

Figure 1:
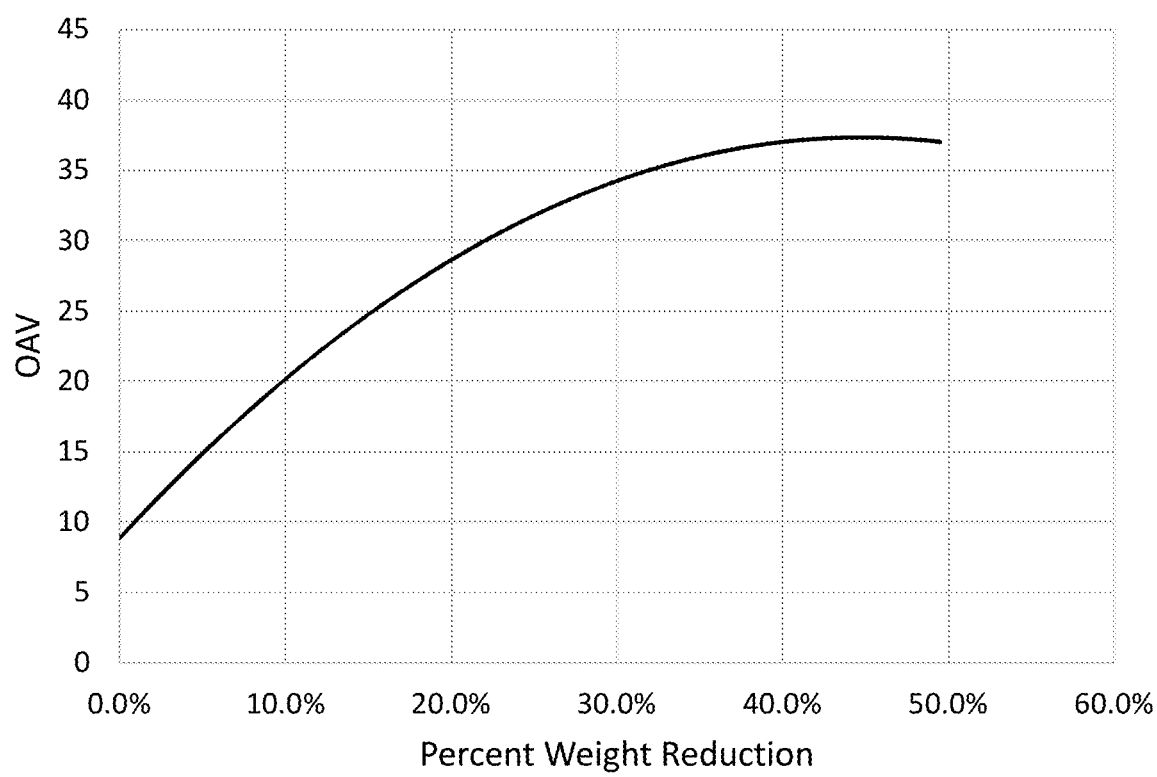
FIG. 1 is a line graph depicting odor activity value as a function of percent weight reduction.

Before the present methods are described, it is to be understood that this invention is not limited to particular methods or systems, and experimental conditions described, as such methods or systems and conditions may vary. It is also to be understood that the terminology used herein is for the purpose of describing particular embodiments only, and is not intended to be limiting, since the scope of the present invention will be limited only by the appended claims.

As used in this specification and the appended claims, the singular forms "a", "an", and "the" include plural references unless the context clearly dictates otherwise. Thus, for example, a reference to "a method" includes one or more methods, elements, and/or steps of the type described herein and/or which will become apparent to those persons skilled in the art upon reading this disclosure and so forth.

As used in this specification and the appended claims, the use of the term "about" means a range of values including and within 15% above and below the named value, except for nominal temperature. For example, the phrase "about 3 mM" means within 15% of 3 mM, or 2.55 mM-3.45 mM, inclusive. Likewise, the phrase "about 3 millimeters (mm)" means 2.55 mm-3.45 mm, inclusive. When temperature is used to denote change, the term "about" means a range of values including and within 15% above and below the named value. For example, "about 5° C.," when used to denote a change such as in "a thermal resolution of better than 5° C. across 3 mm," means within 15% of 5° C., or 4.25° C.-5.75° C. When referring to nominal temperature, such as "about −50° C. to about +50° C.," the term "about" means±5° C. Thus, for example, the phrase "about 37° C." means 32° C.-42° C.

Unless defined otherwise, all technical and scientific terms used herein have the same meaning as commonly understood by one of ordinary skill in the art to which this invention belongs. Although any systems, elements, methods and materials similar or equivalent to those described herein can be used in the practice or testing of the present invention, the preferred systems, elements, and methods and materials are now described. All publications mentioned herein are incorporated herein by reference to describe in their entirety.

The term "or" as used in this specification and the appended claims is meant to be an exclusive identification between two terms, meaning "either". Therefore, when the "or" term is used with reference to items A and B, for example, as in "items A or B", the phrase should be viewed as "either of item A and item B, not both of item A and B." The term "and" as used in the appended claims and the specification is mean to be inclusive. In using the item A and B example above, the phrase "item A and item B" should be viewed as "both of item A along with item B." If the term "and/or" is used in the claims and specification, the term should be viewed as inclusive and exclusive. Therefore, in the example above, the phrase "A and/or B" should be viewed as "either 'A or B' or 'A and B'".

References in the specification to "one embodiment", "an embodiment", "a preferred embodiment", "an alternative embodiment", "a variation", "one variation", and similar phrases mean that a particular feature, structure, or characteristic described in connection with at least one embodiment of the invention. The appearances of phrases like "in one embodiment", "in an embodiment", or "in a variation" and similar phrases in various places in the specification are not necessarily all meant to refer to the same embodiment or variation and may refer to multiple embodiments or variations. Similarly, the word "exemplary" is used herein to mean "serving as an example, instance, or illustration." Any use of the term "exemplary" herein is not necessarily to be construed as preferred or advantageous over other embodiments.

The disclosure teaches a textile fabric containing a yarn spun from fibers and/or a continuous filament yarn containing a molecule-adsorbing particle additive, and which has been processed with a weight reduction process.

The weight reducing process removes the base polymer material exposing more of the additive to the external environment, thereby increasing the effective concentration of the additive, which in turn increases function of the fiber, yarn, and fabric. This works for additives that interact with the surrounding environment that require surface area exposure of the product. The product made with a doped additive and a weight reduction process produces textiles with improved physical properties. Haggquist in U.S. Pat. No. 7,247,374 (hereafter '374; incorporated by reference in its entirety) teaches the use of a removable encapsulant that improves the functionality of polymers doped with additives that interact with the surrounding environment. This disclosure teaches methods that allow for the exposure of the additive by pre-coating the additive which is subsequently removed later. There is no requirement for the use of a removable encapsulant, but the combination of using this teaching with disclosure as taught in the '374 patent yields products with higher levels of performance.

The disclosure teaches textiles and a method to be used to produce textiles with a molecule-adsorbing particle additive creating performance fabrics. Exemplary additives, such as, activated carbon or zeolites, improve the comfort for users by moving moisture vapor from next to skin to the outside of the garment. The lower humidity next to skin leads to lower apparent temperature, thermoregulation, and higher levels of comfort.

The invention provides improved textile fibers and fabrics having improved water and odor-adsorbing function and improved methods for making these textile fibers and fabrics. In one embodiment, the subject textile fiber is a polymer fiber doped with molecule-adsorbing particles positioned at the surface of the fiber and exposed to the external environment in sufficient numbers or density to improve the molecule-adsorption capacity and to improve the thermoregulation through humidity management of articles of clothing made from the subject fibers. In another embodiment, the subject textile is a polymer fiber doped with molecule-adsorbing particles positioned at the surface of the fiber and exposed to the external environment in sufficient numbers or density, which results in a fiber or fabric with improved molecule-adsorption capacity and improved thermal comfort, produced by removing a portion of the outer layer of a doped fiber by weight reducing the fiber.

Polymers

Polymers useful in the practice of this invention include any polymer now known or later discovered that can be spun into fiber or cast into a sheet. The polymer may be a synthetic polymer or a natural polymer, or a composite containing natural and synthetic polymers. As used herein, synthetic polymer may be used interchangeably with plastic. Preferred synthetic polymers include thermoplastics that retain flexibility at ambient and physiological temperatures.

As used herein, preferred synthetic polymers can be sufficiently melted to allow for the addition of particles (e.g., pigments, molecule-adsorbing particles, anti-microbial materials, and the like) and subsequent extrusion into fibers or sheets.

Synthetic polymers include polymers that are artificially synthesized from monomer units. For example, monomer units may be linked by ester bonds, ether bonds, amide bonds, carbon-to-carbon bonds, glycosidic bonds, and the like. Monomer units can include one or more molecules, such as, e.g., dicarboxylic acids, diamines, lactic acid, glycolic acid, carbonic acid, styrene, ethylene, propylene, vinyl, ethylene terephthalate, tetrafluoroethylene, and the like. For example, polymers of ethylene terephthalate linked by ester bonds are known as polyethylene terephthalate or PET, a commonly used polyester. In another example, polymers of dicarboxylic acids and diamines linked by amide bonds are known as nylon. Nylons and polyesters are well-known and useful thermoplastic synthetic polymers used to make textile fibers, and are useful in the practice of the subject invention. Other useful synthetic polymers include, but not limited to, polystyrene, polyvinyl chloride, polyethylene, polypropylene, polytetrafluoroethylene, polycarbonate, and the like.

The polymer may be a natural polymer. Natural polymers, of which natural fibers can comprise, include proteins, polynucleotides, fatty acids, and polysaccharides. Specific natural polymers useful in the practice of the subject invention include, but are not limited to, cellulose (β linked D-glucose units), fibroin (comprising repeating units of Gly-Ser-Gly-Ala-Gly-Ala), keratin, chitosan, chitin, and the like. Natural fibers, which contain natural polymers, can be derived from plant or animal sources and include inter alia silk, sinew, wool, catgut, angora, mohair, alpaca, cotton, flax, jute, kenaf, industrial hemp, ramie, rattan, vine fibers, coir, kapok, and milkweed.

In a preferred embodiment, the natural polymer is cellulose that is extracted and purified from any source (e.g., straw, wood, bast, stems, leaves, seeds, and the like). Purified cellulose, such as, e.g., purified cellulose, microcrystalline cellulose from wood pulp, and the like, can be used to make what is known in the art as regenerated cellulose (e.g., Viscose, rayon, acetate, triacetate, modal, Tencel, Lyocell, and the like). Here, solubilized cellulose polymer in the form of a slurry, gel, or liquid can be doped with molecule-adsorbing particles and then cast into fibers.

In some embodiments, the subject fibers can be made from a combination of polymer fibers, including combinations of natural and synthetic polymers, such as cellulose and polyester to obtain specific functional attributes. Polyester/cellulose blends, for example, confer super hydrophobic and super hydrophilic properties to the fiber and fabric.

Particles

Particles useful in the practice of the subject invention include any known or yet to be discovered molecule-adsorbing particles. As used herein, the term molecule-adsorbing particle includes any particle that can adsorb any one or more of small molecules (<1,000 daltons), such as air, water, butane, butyric acid, polyamines, and the like, large molecules (≥1,000 daltons) such as proteins, carbohydrates, fats, and the like, and microbes (50 nm-60 μm) such as viruses, yeasts, and bacteria.

Other particles may be included in subject manufactures, such as pigment particles that confer color and optical finish such as, e.g., $TiO_2$, anti-microbial particles that arrest the growth and proliferation of bacteria and molds such as, e.g., silver or silver ion-containing particles, and molecule-adsorbing particles that chelate or otherwise surround or inactivate undesired molecules, such as, e.g., particles containing desferrioxamine, ethylenediaminetetraacetic acid, or the like.

In one embodiment, the subject polymer, fiber, fabric, or garment does not contain silver, silver ions, or silver-containing compounds.

Molecule-adsorbing particles generally provide a large surface area per weight. A notable example of a molecule-adsorbing particle having a very large surface area per weight is biochar, which has a surface area of up to 1,000 $m^2$ per gram. In some embodiments, the molecule-adsorbing particles have a surface area of about 2 $m^2$ per gram, 3 $m^2$ per gram, 4 $m^2$ per gram, 5 $m^2$ per gram, 6 $m^2$ per gram, 7 $m^2$ per gram, 8 $m^2$ per gram, 9 $m^2$ per gram, 10 $m^2$ per gram, 15 $m^2$ per gram, 20 $m^2$ per gram, 25 $m^2$ per gram, 30 $m^2$ per gram, 40 $m^2$ per gram, 50 $m^2$ per gram, 75 $m^2$ per gram, 100 $m^2$ per gram, 150 $m^2$ per gram, 200 $m^2$ per gram, 250 $m^2$-1,000 $m^2$ per gram, 5 $m^2$-15 $m^2$ per gram, 1 $m^2$-10 $m^2$ per gram, 6 $m^2$-14 $m^2$ per gram, 7 $m^2$-13 $m^2$ per gram, 8 $m^2$-112 $m^2$ per gram, or 9 $m^2$-11 $m^2$ per gram.

In one embodiment, the average diameter of the particles is less than the diameter of the fiber. For example, particles useful for doping a 7.5 μm radius (15 μm diameter) fiber have an average diameter that is ≤15 μm. Particles having sub-micron size are also included. In some embodiments, the particles have an average diameter of about 0.5 μm-15 μm, 1 μm-20 μm, 2 μm-15 μm, 1.5 μm-15 μm, 4 μm-14 μm, 1 μm-100 μm, 1 μm-50 μm, about 0.5 μm, about 1 μm, about 1.5 μm, about 2 μm, about 2.5 μm, about 3 μm, about 3.5 μm, about 4 μm, about 4.5 μm, about 5 μm, about 5.5 μm, about 6 μm, about 6.5 μm, about 7 μm, about 7.5 μm, about 8 μm, about 8.5 μm, about 9 μm, about 9.5 μm, about 10 μm, about 10.5 μm, about 11 μm, about 11.5 μm, about 12 μm, about 12.5 μm, about 13 μm, about 13.5 μm, about 14 μm, about 14.5 μm, about 15 μm, about 15.5 μm, about 16 μm, about 16.5 μm, about 17 μm, about 17.5 μm, about 18 μm, about 18.5 μm, about 19 μm, about 19.5 μm, or about 20 μm.

In some embodiments, the subject molecule-adsorbing particles may include, but are not limited to, activated carbon and zeolites. Activated carbon may be derived, for example, from wood, bamboo, coal, coconut, or bithmus. Activated carbon may also be derived synthetically. In a preferred embodiment, the molecule-adsorbing particles include zeolite. In a more preferred embodiment, the molecule-adsorbing zeolite particles may include zeolites that absorbs infrared light in the region between 700 to 1500 $cm^{-1}$ as measured by Fourier-transform infrared spectroscopy (FTIR) (see Byrappa and Kumar, *Asian Journal of Chemistry*, 19(6), pp. 4933-4935 (2007)). In one embodiment, the zeolite is an aluminosilicate, analcime, chabazite, clinoptilolite, heulandite, natrolite, phillipsite, or stilbite.

In some embodiments, particles useful in the practice of the subject invention include any known or yet to be discovered particles that absorb molecules (i.e., molecule-absorbing particles). Exemplary molecule-absorbing particles include, but are not limited to, clay, silica gel, calcium oxide, calcium sulfate, and the like.

In some embodiments, the subject molecule-adsorbing particle can adsorb an amount of water, odor molecules, or other undesirable molecules to convey thermal, humidity and/or odor management qualities to the fiber, fabric, or garment. In some embodiments, the subject molecule-adsorbing particle can adsorb molecules at about 0.1%-100%, 1%-100%, about 1%-20%, about 2%-19%, about 3%-18%, about 4%-17%, about 5%-16%, about 6%-about 15%, about 7%-14%, about 8%-13%, about 9%-12%, about 10%-11%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, or 10% of the weight of the particle. In one embodiment, the subject molecule-adsorbing particle can pick up or adsorb >10% water vapor by weight at 20° C. after drying at 200° C. for 30 minutes.

Fibers

As used herein, the term "fiber" applies to monofilaments, multifilament fibers, and staple fibers used in the production of yarns and fabric. Fibers may be of any thickness, shape, and length.

In some embodiments, the subject fibers have a cross-sectional aspect ratio of 4, ≤3.5, ≤3, ≤2.5, ≤2, ≤1.5, about 1, about 1-1.5, or about 1-1.5. Preferred fibers are roughly cylindrical.

In some embodiments, the subject fibers have a cross-sectional radius of 0.1 μm-20 μm, 0.1 μm-15 μm, 0.1 μm-10 μm, 0.1 μm-7.5 μm, 0.1 μm-5 μm, about 0.5 μm, about 1 μm, about 1.5 μm, about 2 μm, about 2.5 μm, about 3 μm, about 3.5 μm, about 4 μm, about 4.5 μm, about 5 μm, about 5.5 μm, about 6 μm, about 6.5 μm, about 7 μm, about 7.5 μm, about 8 μm, about 8.5 μm, about 9 μm, about 9.5 μm, about 10 μm, about 10.5 μm, about 11 μm, about 11.5 μm, about 12 μm, or about 12.5 μm.

The subject fibers are doped with molecule-adsorbing particles. In some embodiments, there is no requirement for a given concentration of particles within the fiber or polymer, but merely the requirement to provide a sufficient density of particles exposed to the surface of the fiber to enable effective adsorption of water and/or odor molecules. In some embodiments, the fibers contain molecule-adsorbing particles at a weight-to-weight ratio of particles-to-fiber or particles-to polymer of 0.05%-5% (i.e., 500 ppm-50,000 ppm), 0.1%-5%, 0.2%-4%, 0.2%-2%, 0.4%-0.6%, about 0.1%, about 0.2%, about 0.3%, about 0.4%, about 0.5%, about 0.6%, about 0.7%, about 0.8%, about 0.9%, about 1%, about 1.5%, or about 2% (i.e., 20,000 ppm).

In some embodiments, the molecule-adsorbing particles are present in the polymer or fiber at a concentration of 0-20,000 ppm, 0-250 ppm, 250-1000 ppm, 1000-5000 ppm, 5000-20000 ppm, 100-1000 ppm, 200-2000 ppm, 500-6000 ppm, or 250-20000 ppm.

The amount of inorganic particles (e.g., zeolites and any $TiO_2$ that may be present) can be determined by measuring the percent weight of ash from the doped fiber. Generally, an ash test involves taking a known amount of sample, placing the weighed sample into a dried/pre-weighed porcelain crucible, burning away the polymer and weighing the crucible after it is has cooled to room temperature in a desiccator. Ash residue remaining in the crucible is attributed to inorganic content that did not burn off (i.e., the subject particles). Ash content analysis of plastics can be determined using the methods specified in ASTM D2584, ASTM D5630, and ISO 3451.

In some embodiment of the invention, the subject fiber is processed to expose a greater number of molecule-adsorbing particles to the surface of the fiber. In one embodiment, the fiber is subjected to weight reduction to expose the greater number of molecule-adsorbing particles to the surface of the fiber. Here, the weight reduction step may change the overall concentration of particles as determined by an ash test. In an exemplary embodiment, a polyester fiber yarn containing about 4000 ppm to about 6000 ppm of zeolite (and 0.27%-0.35% $TiO_2$) was weight reduced by varying amounts and then subjected to the ash test, which indicated an ash content of about 0.6% to about 1.1% (w).

In some embodiments, the ash content by weight of the molecule-adsorbing particle-containing subject fibers, yarns, or sheets is about 0.05%-5%, about 0.5%-5%, about 1%-5%, about 1.5%-5%, about 2%-5%, about 0.05%-2%, about 0.05%-1.5%, about 0.05%-1%, about 0.01%, about 0.02%, about 0.03%, about 0.04%, about 0.05%, about 0.1%, about 0.15%, about 0.2%, about 0.25%, about 0.3%, about 0.35%, about 0.4%, about 0.45%, about 0.5%, about 0.55%, about 0.6%, about 0.65%, about 0.7%, about 0.75%, about 0.8%, about 0.85%, about 0.9%, about 0.95%, about 1%, about 1.1%, about 1.2%, about 1.3%, about 1.4%, about 1.5%, about 1.6%, about 1.7%, about 1.8%, about 1.9%, about 2%, about 2.5%, about 3%, about 3.5%, about 4%, about 5.5%, or about 5%

In one embodiment, the improved fiber is produced by reducing the weight of doped fibers. The amount of weight reduction can be any amount that improves the adsorbance-related function of the textile while retaining overall softness, hand, and/or drape of the fabric. In some embodiments, the weight of the fiber/yarn is reduced by about 0.5%-50%, about 1%-30%, about 5%-30%, about 5%-50%, about 5%-55%, about 0.5%, about 1%, about 1.5%, about 2%, about 2.5%, about 3%, about 3.5%, about 4%, about 4.5%, about 5%, about 5.5%, about 6%, about 6.5%, about 7%, about 7.5%, about 8%, about 8.5%, about 9%, about 9.5%, about 10%, about 11%, about 12%, about 13%, about 14%, about 15%, about 20%, about 25%, about 30%, about 35%, about 40%, about 45%, about 50%, or about 55%.

Percent weight reduction, as it relates to removal of a portion outer surface of the fiber/yarn, correlates to the depth (thickness) of the outer surface portion as a function of fiber radius. Thus, in some embodiments, the thickness of the outer layer that is removed is 0.1 μm-10 μm, 0.1 μm-9 μm, 0.1 μm-8 μm, 0.1 μm-7 μm, 0.1 μm-6 μm, 0.1 μm-5 μm, 0.1 μm-4 μm, 0.1 μm-3 μm, 0.1 μm-3 μm, 0.1 μm-2 μm, 0.1 μm-1 μm, 0.1 μm-0.5 μm, about 0.1 μm, about 0.2 μm, about 0.3 μm, about 0.4 μm, about 0.5 μm, about 1 μm, about 1.5 μm, about 2 μm, about 2.5 μm, about 3 μm, about 3.5 μm, about 4 μm, about 4.5 μm, or about 5 μm.

In some embodiments, the thickness of the outer layer that is removed is about 1%-99%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, or about 95% of the mean or mode average diameter of the molecular-adsorbing particles embedded within the fiber. In a preferred embodiment, the thickness of the outer layer that is removed does not exceed about 50% of the mean or mode average diameter of the molecular-adsorbing particles embedded within the fiber.

In one exemplary embodiment, a pre-weight reduced fiber having a radius of 7.5 μm and cross-sectional area of 176.71 μm$^2$ was weight reduced by 5% resulting in a fiber having a radius of 7.31 μm and cross-sectional area of 167.88 μm$^2$. Thus, here a weight reduction of 5% created a radius reduction (removed layer thickness) of 0.19 μm. Table 1 describes the change in radius associated with percent weight reduction for a 7.5 μm fiber.

TABLE 1

| Weight to radius changes | | |
|---|---|---|
| Weight Reduction | Radius Reduction | % Radius Reduction |
| 0% | 0 | 0 |
| 5% | 0.19 | 1% |
| 10% | 0.38 | 3% |
| 15% | 0.59 | 4% |
| 20% | 0.79 | 5% |
| 25% | 1.00 | 7% |

TABLE 1-continued

| Weight to radius changes | | |
|---|---|---|
| Weight Reduction | Radius Reduction | % Radius Reduction |
| 30% | 1.23 | 8% |
| 35% | 1.45 | 10% |
| 40% | 1.69 | 11% |
| 45% | 1.94 | 13% |
| 50% | 2.20 | 15% |

As disclosed herein, reduction of the radius or weight of the subject particle-doped fiber or yarn correlates with improved adsorption of water, odor, or other molecules and a concomitant improvement in fabric function. Several methods are used to measure the adsorbance capacity of textiles. For example, the adsorption of butane is used as an indicator of adsorption of butyric acid, an odor molecule, and correlated to a textile's ability to remove odor (and, by analogy, remove water and reduce humidity). Thus, butane adsorbance (as determined by standard testing procedures such as ASTM D5228) correlates with odor activity value (OAV) expressed as the relative weight of butane adsorbed per unit weight of fiber/yarn. Here, an OAV of 1 means that 1 gram of doped fiber/yarn adsorbs 0.1 milligram of butane, an OAV of 10 means that 1 gram of doped fiber/yarn adsorbs 1 milligram of butane, an OAV of 100 means that 1 gram of doped fiber/yarn adsorbs 10 milligrams of butane. Also, an OAV of 100 for a first article compared to an OAV of 10 for the second article, means that the first article adsorbs 10-times more of a molecule (e.g., the odor molecule or indicator molecule like butane) per weight.

In one embodiment, the OAV of a particle-doped fiber or yarn that is weight reduced to remove a portion of the outer surface of the fiber or yarn is increased by about 40%-360%, about 25%, about 30%, about 35%, about 40%, about 45%, about 50%, about 55%, about 60%, about 65%, about 70%, about 75%, about 80%, about 85%, about 90%, about 95%, about 100%, about 110%, about 120%, about 130%, about 140%, about 160%, about 170%, about 180%, about 190%, about 200%, about 220%, about 240%, about 260%, about 280%, about 300%, about 320%, about 340%, about 360%, about 380%, about 400%, or more than 300% relative to a like particle-doped fiber or yarn that is not weight reduced.

In one embodiment, the OAV of a particle-doped fiber or yarn that is weight reduced to remove a portion of the outer surface of the fiber or yarn is increased by about 40%-360%, about 25%, about 30%, about 35%, about 40%, about 45%, about 50%, about 55%, about 60%, about 65%, about 70%, about 75%, about 80%, about 85%, about 90%, about 95%, about 100%, about 110%, about 120%, about 130%, about 140%, about 160%, about 170%, about 180%, about 190%, about 200%, about 220%, about 240%, about 260%, about 280%, about 300%, about 320%, about 340%, about 360%, about 380%, about 400%, or more than 300% relative to a like particle-doped fiber or yarn that is not weight reduced.

In one embodiment, the OAV of the subject particle-doped fiber or yarn is about 15-50, ≥15, ≥20, ≥25, ≥30, ≥35, ≥40, ≥45, ≥50, about 15, about 20, about 25, about 30, about 35, about 40, about 45, or about 50.

In one exemplary embodiment, 7.5 μm radius polyester fiber samples doped with at least about 5000 ppm of zeolite were weight reduced by about 5% to about 50% and the subjected to butane loading. Here, the OAV increased in correlation with increased weight reduction from 5% to about 30% weight reduction, at which point the OAV reached a plateau (FIG. 1).

Manufacturing Process

The subject fibers and yarn doped with molecule-adsorbing particles and having improved textile adsorption and comfort properties can be made by any method now known or yet to be discovered.

Figure 2:
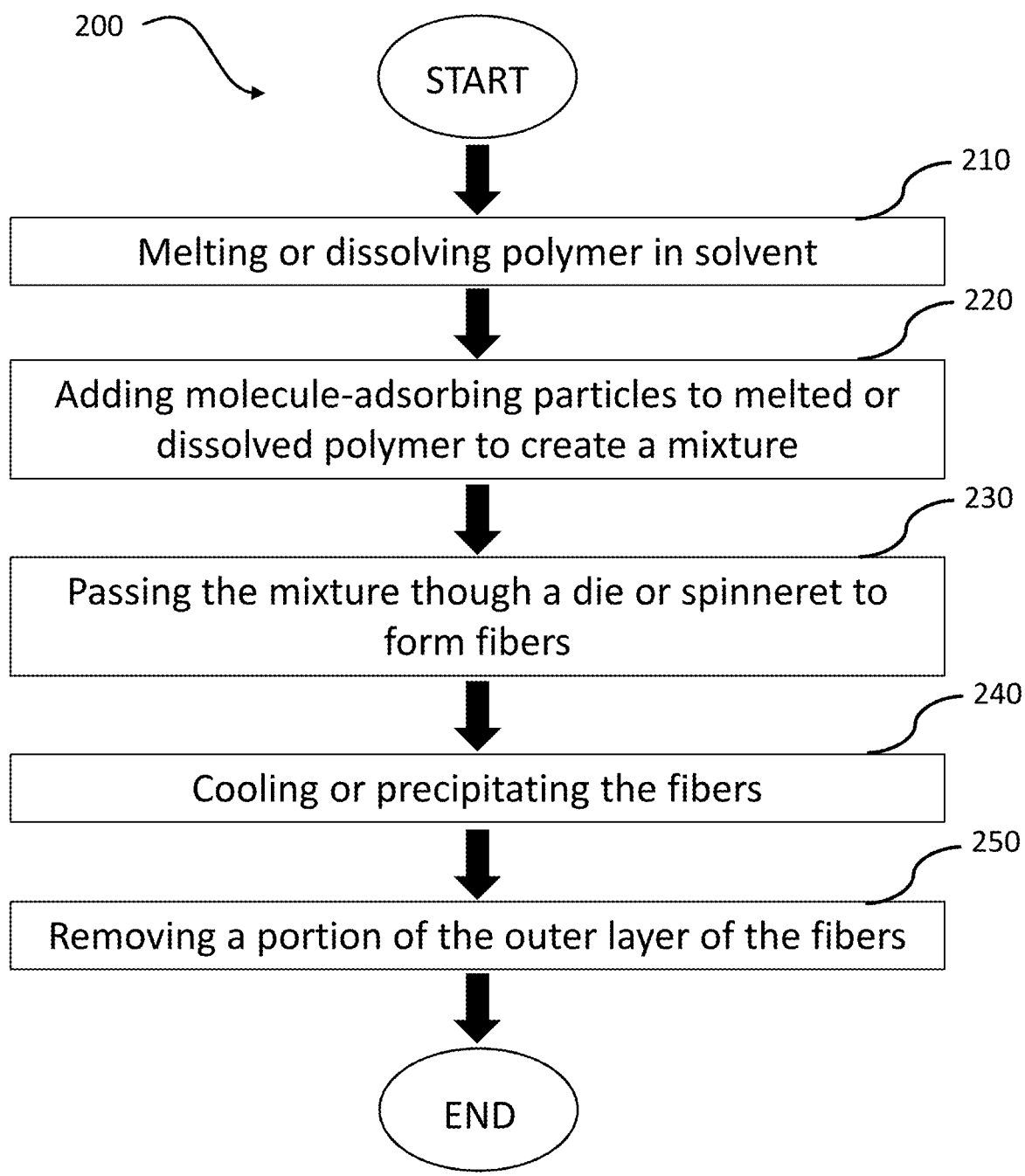
FIG. 2 is a flow chart depicting a process for making the article of manufacture.

Turning to FIG. 2, in one embodiment, the subject fiber is made by a process 200 including the steps of: liquifying a polymer by melting the polymer or dissolving the polymer in a solvent 210; adding molecule-adsorbing particles to the melted or dissolved polymer to create a mixture 220; passing the mixture though a die or spinneret to form fibers 230; cooling or precipitating the fibers 240 to form solidified fibers; and removing a portion of the outer layer of the solidified fibers 250 to expose a subset of the molecule-adsorbing particles to the environment.

In one embodiment, the fibers are formed using a melt spinning process, whereby molten polymer (e.g., a synthetic polymer such as a polyester, a nylon, or more specifically a polyethylene terephthalate) is combined with the molecule-adsorbing particles and then extruded through a spinneret and then directly solidified by cooling. The formed fibers or yarn are then subjected to a weight reduction step to facilitate exposure of the molecule-adsorbing particles to the outside surface of the fibers.

In one embodiment, the fibers are formed using a dry spinning process, whereby polymer is combined with a solvent and solubilized, the molecule-adsorbing particles are added to the solution, and then the suspension is fed through jet nozzles into a spinning duct, where the spun fibers are dried by a heated airflow extruded through a spinneret and then directly solidified by cooling. The formed fibers or yarn are then subjected to a weight reduction step to facilitate exposure of the molecule-adsorbing particles to the outside surface of the fibers.

In one embodiment, the fibers are formed using a wet spinning process, whereby polymer (e.g., a natural polymer such as cellulose) is combined with a solvent and solubilized, the molecule-adsorbing particles are added to the solution, and then the suspension is fed through jet nozzles into a spinneret that is submerged in a chemical bath that causes the fiber to precipitate, and then solidify, as it emerges. The formed fibers or yarn are then subjected to a weight reduction step to facilitate exposure of the molecule-adsorbing particles to the outside surface of the fibers.

In one embodiment, the produced fibers or yarns are subjected to weight reduction to remove a portion of the outer layer to expose molecule-adsorbing particles to the external environment. The method of weight reduction includes any known or yet to be discovered method. The method of weight reduction can be a chemical or a physical process. In another embodiment, "weight reduction" means reducing the weight ratio of polymer to particles, which may be achieved by increasing the relative loading concentration of particles in the polymer.

In some embodiments, the fiber or yarn is weight reduced by caustic reduction (e.g., LiOH, NaOH, or KOH treatment), acidic oxidation (e.g., sulfuric acid, phosphoric acid, or hydrochloric acid treatment), enzymatic digestion (e.g., cellulase treatment), mercerization, solvent treatment, detergent treatment, corona discharge, UV etching or oxidation, laser etching, plasma etching, die cutting (running the fiber or yarn through a die that strips away part of the outer layer), or the like.

Figure 3:
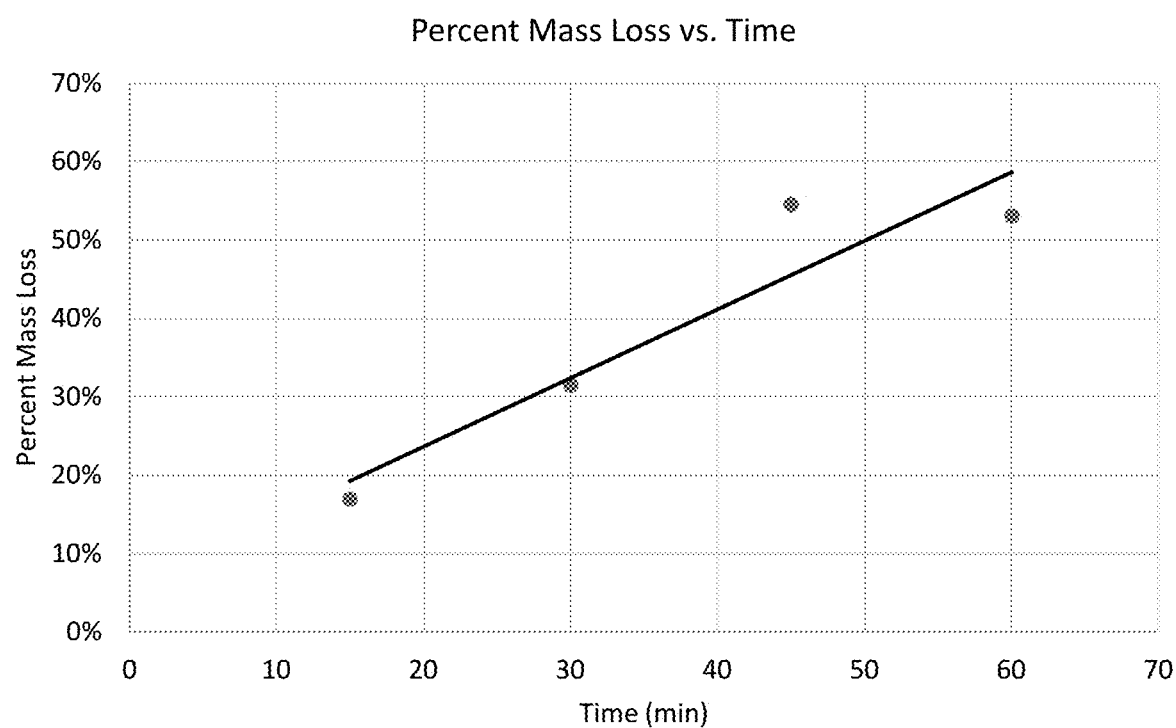
FIG. 3 is a dot plot and line graph depicting percent mass loss as a function of time.

In a more specific embodiment, weight reduction of doped polyester yarns is achieved by caustic reduction. Here, polyester yarns made via melt spinning and containing 0.2%-2%, preferably about 0.5% by weight of molecule-adsorbing particles, preferably zeolite are exposed to 10% NaOH solution at 90° C. for 15 minutes to 2 hours to remove the polyester outer layer. In an exemplary embodiment, a 7.5 µm radius polyester 75-48 yarn (PET) was treated with a 10% (w/w) solution of NaOH at 90° C. for various times, resulting in increased weight reduction at longer times out to about 40-45 minutes of treatment where weight loss appears to plateau (Table 2 and FIG. 3).

TABLE 2

Effect of time on weight loss

| Time (min) | Initial Mass (g) | Mass after NaOH treatment (g) | % loss (weight reduction) |
|---|---|---|---|
| 5 | | | |
| 10 | | | |
| 15 | 0.1325 | 0.1101 | 16.9% |
| 30 | 0.1438 | 0.0986 | 31.4% |
| 45 | 0.1505 | 0.0685 | 54.5% |
| 50 | | | 54.0% |
| 60 | 0.1345 | 0.0632 | 53.0% |

In some embodiments, the doped polymer is cast or extruded into sheets. Here, the sheets are subjected to weight reduction by chemical or physical methods as described herein. In some embodiments, the doped polymer sheets are weight-reduced by milling or planning. In some embodiments, the weight-reduced doped-polymer sheets can be assembled in layers or fastened in larger sheets to produce fabrics, mats, fabrication materials, and the like.

Fabric

Fabrics and clothing made using the disclosed improved fibers and yarns have improved odor reducing, improved humidity reducing, and lower apparent temperature attributes. Here, the apparent temperature of garments made from the disclosed improved fibers and yarns is lower than garments made from fibers and yarns that were not weight reduced. As used herein, the term "apparent temperature" means the perceived temperature accounting for humidity. By removing water vapor from the microclimate between the skin and the garment, the improved disclosed fabric manages the overall apparent temperature and concomitantly increases the comfort of the wearer. Here, apparent temperature can be determined by measuring temperature and humidity near the skin of a wearer and using the algorithm described in Robert G. Steadman, "A Universal Scale of Apparent Temperature," *Journal of Climate and Applied Meterology*, 23: 1674-1687 (1984), which is herein incorporated by reference in its entirety.

In one embodiment, the subject garments or fabrics reduce the apparent temperature to a wearer of the garments or fabrics by about 0.5° C., about 1° C., about 1.5° C., about 2° C., about 2.5° C., about 3° C., about 3.5° C., about 4° C., about 4.5° C., about 5° C., about 5.5° C., about 6° C., about 6.5° C., about 7° C., about 7.5° C., or about 8° C. relative to the apparent temperature to a wearer wearing a similarly manufactured garment made with similar molecule-adsorbing particle-doped fibers and yarns but without a weight reduction step.

Persons skilled in the art will appreciate that the present invention can be practiced by other than the described embodiments, which are presented for purposes of illustration rather than of limitation, and the invention is limited only by the claims which follow.

SPECIFIC EMBODIMENTS

The invention provides specific non-limiting aspects and embodiments thereof.

In a first aspect, the invention provides a manufacture.

In a first embodiment of the first aspect, the manufacture comprises a polymer and a plurality of particles embedded within the polymer, wherein a portion of the surface of the polymer is removed to expose a subset of the plurality of particles to the external environment.

In a second embodiment of the first aspect, the portion of the surface of the polymer of the first embodiment that is removed represents 5%-50% by weight of the polymer before removal of the surface portion.

In a third embodiment of the first aspect, the plurality of particles of the first embodiment or the second embodiment comprises particles having an average diameter of 0.2 µm-50 µm.

In a fourth embodiment of the first aspect, the plurality of particles of any one of the first through the third embodiments has a surface area of at least about 10 square meters per gram.

In a fifth embodiment of the first aspect, the plurality of particles of any one of the first through the fourth embodiments can adsorb at least 10% by weight of water.

In a sixth embodiment of the first aspect, the plurality of particles of any one of the first through the fifth embodiments comprise zeolite.

In a seventh embodiment of the first aspect, the plurality of particles of any one of the first through the sixth embodiments comprise Activated carbon.

In an eighth embodiment of the first aspect, the plurality of particles of any one of the first through the seventh embodiments does not comprise silver or silver ions.

In a ninth embodiment of the first aspect, the polymer of any one of the first through eighth embodiments comprises or consists of a polyester or other synthetic polymer.

In a tenth embodiment of the first aspect, the polymer of any one of the first through eighth embodiments comprises or consists of cellulose or other natural polymer.

In an eleventh embodiment of the first aspect, the concentration of particles embedded in the polymer of any one of the first through tenth embodiments is 0.1%-2% by weight.

In a twelfth embodiment of the first aspect, the manufacture of any one of first through eleventh embodiments is a fiber comprising two or more filaments to form a yarn.

In a thirteenth embodiment of the first aspect, the manufacture of any one of first through eleventh embodiments is a monofilament fiber.

In a fourteenth embodiment of the first aspect, one or more particle(s) of said plurality of particles of any one of the first through thirteenth embodiments absorbs infrared light in the region between 700 to 1500 $cm^{-1}$ as measured by Fourier-transform infrared spectroscopy (FTIR).

In a second aspect, the invention provides a fiber.

In a first embodiment of the second aspect, the fiber comprises a polymer and a plurality of particles embedded within the polymer, wherein a portion of the surface of the fiber is removed to expose a subset of the plurality of particles to the external environment.

In a second embodiment of the second aspect, the portion of the surface of the fiber of the first embodiment that is removed represents 5%-50% by weight of the fiber before removal of the surface portion.

In a third embodiment of the second aspect, the plurality of particles of the first embodiment or the second embodiment comprises particles having an average diameter of 0.2 µm-50 µm.

In a fourth embodiment of the second aspect, the plurality of particles of any one of the first through third embodiments has a surface area of at least about 10 square meters per gram.

In a fifth embodiment of the second aspect, the plurality of particles of any one of the first through the fourth embodiments can adsorb at least 10% by weight of water.

In a sixth embodiment of the second aspect, the fiber of any one of the first through the fifth embodiments has an average cross-section aspect ratio of about 1-2.

In a seventh embodiment of the second aspect, particles of any one of the first through the sixth embodiments are (a) present at a concentration of 250-20,000 parts per million, or (b) uniformly distributed throughout the entire cross section of the fiber out to and including the surface of the fiber.

In an eighth embodiment of the second aspect, the plurality of particles of any one of the first through the seventh embodiments comprises zeolite.

In a ninth embodiment of the second aspect, the plurality of particles of any one of the first through the eighth embodiments comprises Activated carbon.

In a tenth embodiment of the second aspect, the plurality of particles of any one of the first through the ninth embodiments does not comprise silver or silver ions.

In an eleventh embodiment of the second aspect, the polymer of any one of the first through the tenth embodiments comprises a polyester or other synthetic polymer.

In a twelfth embodiment of the second aspect, the polymer of any one of the first through the tenth embodiments comprises cellulose or other natural polymer.

In a thirteenth embodiment of the second aspect, the fiber of any one of the first through the tenth embodiments or twelfth embodiment is a viscose fiber, a lyocell fiber, a rayon fiber, or a bemberg fiber.

In a fourteenth embodiment of the second aspect, the fiber of any one of the first through the thirteenth embodiments is a yarn comprising two or more filaments.

In a fifteenth embodiment of the second aspect, the fiber of any one of the first through the thirteenth embodiments is a monofilament.

In a sixteenth embodiment of the second aspect, one or more particles of any one of the first through the fifteenth embodiments absorbs infrared light in the region between 700 to 1500 $cm^{-1}$ as measured by Fourier-transform infrared spectroscopy (FTIR).

In an seventeenth embodiment of the second aspect, the fiber of any one of the first through the sixteenth embodiments can absorb 10%-50% butane by weight.

In a third aspect, the invention provides a textile comprising molecule-adsorbing fibers.

In a first embodiment of the third aspect, the fibers comprise a polymer and a plurality of particles embedded within the polymer, wherein a portion of the surface of each fiber is removed to expose a subset of the plurality of particles to the external environment.

In a second embodiment of the third aspect, the portion of the surface of the fiber of the first embodiment that is removed represents 5%-50% by weight of the fiber before removal of the surface portion.

In a third embodiment of the third aspect, the plurality of particles of the first embodiment or the second embodiment comprises particles having an average diameter of 0.2 µm-50 µm.

In a fourth embodiment of the third aspect, the plurality of particles of any one of the first through third embodiments has a surface area of at least about 10 square meters per gram.

In a fifth embodiment of the third aspect, the plurality of particles of any one of the first through the fourth embodiments can adsorb at least 10% by weight of water.

In a sixth embodiment of the third aspect, the fibers of any one of the first through the fifth embodiments have an average cross-section aspect ratio of about 1-2.

In a seventh embodiment of the third aspect, particles of any one of the first through the sixth embodiments are (a) present at a concentration of 250-20,000 parts per million, or (b) uniformly distributed throughout the cross section of the fiber out to and including the surface of the fiber.

In an eighth embodiment of the third aspect, the plurality of particles of any one of the first through the seventh embodiments comprises zeolite.

In a ninth embodiment of the third aspect, the plurality of particles of any one of the first through the eighth embodiments comprises Activated carbon.

In a tenth embodiment of the third aspect, the plurality of particles of any one of the first through the ninth embodiments does not comprise silver or silver ions.

In an eleventh embodiment of the third aspect, the polymer of any one of the first through the tenth embodiments comprises a polyester or other synthetic polymer.

In a twelfth embodiment of the third aspect, the polymer of any one of the first through the tenth embodiments comprises a cellulose or other natural polymer.

In a thirteenth embodiment of the third aspect, the fiber of any one of the first through the tenth embodiments or twelfth embodiment comprises a viscose fiber, a lyocell fiber, a rayon fiber, or a bemberg fiber.

In a fourteenth embodiment of the third aspect, the fiber of any one of the first through the thirteenth embodiments is a yarn comprising two or more filaments.

In a fifteenth embodiment of the third aspect, the fiber of any one of the first through the thirteenth embodiments is a monofilament.

In a sixteenth embodiment of the third aspect, one or more particle of said plurality of particles of any one of the first through the fifteenth embodiments absorbs infrared light in the region between 700 to 1500 $cm^{-1}$ as measured by Fourier-transform infrared spectroscopy (FTIR).

In an seventeenth embodiment of the third aspect, the textile of any one of the first through sixteenth embodiments adsorbs sufficient water vapor to reduce humidity near the skin of a subject wearing the textile.

In a eighteenth embodiment of the third aspect, the textile of any one of the first through seventeenth embodiments reduces the apparent temperature near the skin of a subject by 0.5° C.-15° C.

In a fourth aspect, the invention provides a method for making a fiber.

In a first embodiment of the fourth aspect, the method for making the fiber comprises the steps of (a) providing a liquid or molten polymer (e.g., as in the case for a synthetic polymer such as a molten flowable polyester) or a liquid polymer solution (e.g., such as in the case of dissolved cellulose for producing regenerated cellulose fibers), (b) doping the liquid or molten polymer or liquid polymer solution with 0.5%-10% particles by weight, (c) forming a fiber from said particle-doped polymer, and (d) removing a portion of the surface layer of the fiber to expose particles to the outside environment.

In a second embodiment of the fourth aspect, the fiber of the first embodiment has a cross-section aspect ratio of about 1-2.

In a third embodiment of the fourth aspect, particles of the first embodiment or the second embodiment are (a) present at a concentration of 250-20,000 parts per million, or (b) uniformly distributed throughout the cross section of the fiber out to and including the surface of the fiber.

In a fourth embodiment of the fourth aspect, the average diameter of the particles of any one of the first through third embodiments is 0.01-0.2 of the mean diameter of the fiber.

In a fifth embodiment of the fourth aspect, the particles of any one of the first through fourth embodiments can absorb at least 10% water by weight In a sixth embodiment of the fourth aspect, the polymer of any one of the first through fifth embodiments comprises a synthetic monomer.

In a seventh embodiment of the fourth aspect, the polymer of any one of the first through sixth embodiments comprises an ethylene terephthalate monomer.

In an eighth embodiment of the fourth aspect, the polymer of any one of the first through seventh embodiments comprises a polyester.

In a ninth embodiment of the fourth aspect, the fiber of any one of the first through eighth embodiments is formed by molten extrusion of the liquid or molten polymer.

In a tenth embodiment of the fourth aspect, the polymer any one of the first through fifth embodiments comprises a natural monomer.

In an eleventh embodiment of the fourth aspect, the polymer any one of the first through fifth and tenth embodiments comprises a D-glucose monomer.

In a twelfth embodiment of the fourth aspect, the polymer any one of the first through fifth and tenth through eleventh embodiments comprises cellulose.

In a thirteenth embodiment of the fourth aspect, the fiber any one of the first through fifth and tenth through twelfth embodiments is formed by wet spinning the liquid polymer solution.

In a fourteenth embodiment of the fourth aspect, the particles of any one of the first through thirteenth embodiments have an average diameter of 0.2 μm-50 μm.

In a fifteenth embodiment of the fourth aspect, the portion of the surface layer of the fiber that is removed in any one of the first through fourteenth embodiments has a thickness of about 0.1-10 times the average diameter of the particles.

In a sixteenth embodiment of the fourth aspect, the weight of the surface layer of the fiber that is removed in any one of the first through fifteenth embodiments is 5%-50% of the weight of the fiber before removing the layer.

In a seventeenth embodiment of the fourth aspect, the fiber of any one of the first through sixteenth embodiments is a staple fiber with an odor activity value (OAV) of at least 15.

In an eighteenth embodiment of the fourth aspect, the particles of any one of the first through seventeenth embodiments have a surface area greater than 10 square meters per gram.

In a nineteenth embodiment of the fourth aspect, the particles of any one of the first through eighteenth embodiments comprise zeolite.

In a twentieth embodiment of the fourth aspect, the particles of any one of the first through nineteenth embodiments comprise Activated carbon.

In a twenty-first embodiment of the fourth aspect, the particles of any one of the first through twentieth embodiments do not comprise silver or a silver ion.

In a twenty-second embodiment of the fourth aspect, the portion of surface layer of the fiber of any one of the first through twenty-first embodiments is removed by caustic reduction.

In a twenty-third embodiment of the fourth aspect, the portion of surface layer of the fiber of any one of the first through twenty-second embodiments is removed by treating the fiber with 5%-25% NaOH, LiOH, or KOH at about 80° C.-100° C. for about 15-45 minutes.

In a twenty-fourth embodiment of the fourth aspect, the portion of surface layer of the fiber of any one of the first through twenty-first embodiments is removed by enzymatic digestion.

In a twenty-fifth embodiment of the fourth aspect, the portion of surface layer of the fiber of any one of the first through twenty-first embodiments is removed by mercerization.

In a twenty-sixth embodiment of the fourth aspect, the portion of surface layer of the fiber of any one of the first through twenty-first embodiments is removed by laser etching.

In a twenty-seventh embodiment of the fourth aspect, the portion of surface layer of the fiber of any one of the first through twenty-first embodiments is removed by plasma etching.

In a fifth aspect, the invention provides a fiber useful in making textile fabric.

In a first embodiment of the fifth aspect, the fiber is manufactured by (a) providing a liquid or molten polymer (e.g., as in the case for a synthetic polymer such as a molten flowable polyester) or a liquid polymer solution (e.g., such as in the case of dissolved cellulose for producing regenerated cellulose fibers), (b) doping the liquid or molten polymer or liquid polymer solution with 0.5%-10% particles by weight, (c) forming a fiber from said particle-doped polymer, and (d) removing a portion of the surface layer of the fiber to expose particles to the outside environment.

In a second embodiment of the fifth aspect, the fiber of the first embodiment has a cross-section aspect ratio of about 1-2.

In a third embodiment of the fifth aspect, particles of the first embodiment or the second embodiment are (a) present at a concentration of 250-20,000 parts per million, or (b) uniformly distributed throughout the cross section of the fiber out to and including the surface of the fiber.

In a fourth embodiment of the fifth aspect, the average diameter of the particles of any one of the first through third embodiments is 0.01-0.2 of the diameter of the fiber.

In a fifth embodiment of the fifth aspect, the particles of any one of the first through fourth embodiments can absorb at least 10% water by weight In a sixth embodiment of the fifth aspect, the polymer of any one of the first through fifth embodiments comprises a synthetic monomer.

In a seventh embodiment of the fifth aspect, the polymer of any one of the first through sixth embodiments comprises an ethylene terephthalate monomer.

In an eighth embodiment of the fifth aspect, the polymer of any one of the first through seventh embodiments comprises a polyester.

In a ninth embodiment of the fifth aspect, the fiber of any one of the first through eighth embodiments is formed by molten extrusion of the liquid or molten polymer.

In a tenth embodiment of the fifth aspect, the polymer any one of the first through fifth embodiments comprises a natural monomer.

In an eleventh embodiment of the fifth aspect, the polymer any one of the first through fifth and tenth embodiments comprises a D-glucose monomer.

In a twelfth embodiment of the fifth aspect, the polymer any one of the first through fifth and tenth through eleventh embodiments comprises cellulose.

In a thirteenth embodiment of the fifth aspect, the fiber any one of the first through fifth and tenth through twelfth embodiments is formed by wet spinning the liquid polymer solution.

In a fourteenth embodiment of the fifth aspect, the particles of any one of the first through thirteenth embodiments have an average diameter of 0.2 μm-50 μm.

In a fifteenth embodiment of the fifth aspect, the portion of the surface layer of the fiber that is removed in any one of the first through fourteenth embodiments has a thickness of about 0.1-10 times the average diameter of the particles.

In a sixteenth embodiment of the fifth aspect, the weight of the surface layer of the fiber that is removed in any one of the first through fifteenth embodiments is 5%-50% of the weight of the fiber before removing the layer.

In a seventeenth embodiment of the fifth aspect, the fiber of any one of the first through sixteenth embodiments is a staple fiber with an odor activity value (OAV) of at least 15.

In an eighteenth embodiment of the fifth aspect, the particles of any one of the first through seventeenth embodiments have a surface area greater than 10 square meters per gram.

In a nineteenth embodiment of the fifth aspect, the particles of any one of the first through eighteenth embodiments comprise zeolite.

In a twentieth embodiment of the fifth aspect, the particles of any one of the first through nineteenth embodiments comprise Activated carbon.

In a twenty-first embodiment of the fifth aspect, the particles of any one of the first through twentieth embodiments do not comprise silver or a silver ion.

In a twenty-second embodiment of the fifth aspect, the portion of surface layer of the fiber of any one of the first through twenty-first embodiments is removed by caustic reduction.

In a twenty-third embodiment of the fifth aspect, the portion of surface layer of the fiber of any one of the first through twenty-second embodiments is removed by treating the fiber with 5%-25% NaOH, LiOH, or KOH at about 80° C.-100° C. for about 15-45 minutes.

In a twenty-fourth embodiment of the fifth aspect, the portion of surface layer of the fiber of any one of the first through twenty-first embodiments is removed by enzymatic digestion.

In a twenty-fifth embodiment of the fifth aspect, the portion of surface layer of the fiber of any one of the first through twenty-first embodiments is removed by mercerization.

In a twenty-sixth embodiment of the fifth aspect, the portion of surface layer of the fiber of any one of the first through twenty-first embodiments is removed by laser etching.

In a twenty-seventh embodiment of the fifth aspect, the portion of surface layer of the fiber of any one of the first through twenty-first embodiments is removed by plasma etching.

In a sixth aspect, the invention provides a method for making a textile fabric.

In a first embodiment of the sixth aspect, the textile fabric is manufactured by (a) providing a liquid or molten polymer (e.g., as in the case for a synthetic polymer such as a molten flowable polyester) or a liquid polymer solution (e.g., such as in the case of dissolved cellulose for producing regenerated cellulose fibers), (b) doping the liquid or molten polymer or liquid polymer solution with 0.5%-10% particles by weight, (c) forming a fiber from said particle-doped polymer, (d) removing a portion of the surface layer of the fiber to expose particles to the outside environment, and (e) weaving or knitting said fibers to produce a textile capable of adsorbing water vapor.

In a second embodiment of the sixth aspect, the fiber of the first embodiment has a cross-section aspect ratio of about 1-2.

In a third embodiment of the sixth aspect, particles of the first embodiment or the second embodiment are (a) present at a concentration of 250-20,000 parts per million, or (b) uniformly distributed throughout the cross section of the fiber out to and including the surface of the fiber.

In a fourth embodiment of the sixth aspect, the average diameter of the particles of any one of the first through third embodiments is 0.01-0.2 of the mean diameter of the fiber.

In a fifth embodiment of the sixth aspect, the particles of any one of the first through fourth embodiments can absorb at least 10% water by weight In a sixth embodiment of the sixth aspect, the polymer of any one of the first through fifth embodiments comprises a synthetic monomer.

In a seventh embodiment of the sixth aspect, the polymer of any one of the first through sixth embodiments comprises an ethylene terephthalate monomer.

In an eighth embodiment of the sixth aspect, the polymer of any one of the first through seventh embodiments comprises a polyester.

In a ninth embodiment of the sixth aspect, the fiber of any one of the first through eighth embodiments is formed by molten extrusion of the liquid or molten polymer.

In a tenth embodiment of the sixth aspect, the polymer any one of the first through fifth embodiments comprises a natural monomer.

In an eleventh embodiment of the sixth aspect, the polymer any one of the first through fifth and tenth embodiments comprises a D-glucose monomer.

In a twelfth embodiment of the sixth aspect, the polymer any one of the first through fifth and tenth through eleventh embodiments comprises cellulose.

In a thirteenth embodiment of the sixth aspect, the fiber any one of the first through fifth and tenth through twelfth embodiments is formed by wet spinning the liquid polymer solution.

In a fourteenth embodiment of the sixth aspect, the particles of any one of the first through thirteenth embodiments have an average diameter of 0.2 µm-50 µm.

In a fifteenth embodiment of the sixth aspect, the portion of the surface layer of the fiber that is removed in any one of the first through fourteenth embodiments has a thickness of about 0.1-10 times the average diameter of the particles.

In a sixteenth embodiment of the sixth aspect, the weight of the surface layer of the fiber that is removed in any one of the first through fifteenth embodiments is 5%-50% of the weight of the fiber before removing the layer.

In a seventeenth embodiment of the sixth aspect, the fiber of any one of the first through sixteenth embodiments is a staple fiber with an odor activity value (OAV) of at least 15.

In an eighteenth embodiment of the sixth aspect, the particles of any one of the first through seventeenth embodiments have a surface area greater than 10 square meters per gram.

In a nineteenth embodiment of the sixth aspect, the particles of any one of the first through eighteenth embodiments comprise zeolite.

In a twentieth embodiment of the sixth aspect, the particles of any one of the first through nineteenth embodiments comprise Activated carbon.

In a twenty-first embodiment of the sixth aspect, the particles of any one of the first through twentieth embodiments do not comprise silver or a silver ion.

In a twenty-second embodiment of the sixth aspect, the portion of surface layer of the fiber of any one of the first through twenty-first embodiments is removed by caustic reduction.

In a twenty-third embodiment of the fourth aspect, the portion of surface layer of the fiber of any one of the first through twenty-second embodiments is removed by treating the fiber with 5%-25% NaOH, LiOH, or KOH at about 80° C.-100° C. for about 15-45 minutes.

In a twenty-fourth embodiment of the fourth aspect, the portion of surface layer of the fiber of any one of the first through twenty-first embodiments is removed by enzymatic digestion.

In a twenty-fifth embodiment of the fourth aspect, the portion of surface layer of the fiber of any one of the first through twenty-first embodiments is removed by mercerization.

In a twenty-sixth embodiment of the fourth aspect, the portion of surface layer of the fiber of any one of the first through twenty-first embodiments is removed by laser etching.

In a twenty-seventh embodiment of the sixth aspect, the portion of surface layer of the fiber of any one of the first through twenty-first embodiments is removed by plasma etching.

In a twenty-eighth embodiment of the fifth aspect, the textile fabric of any one of the first through twenty-seventh embodiments adsorbs sufficient water vapor to reduce humidity near the skin of a subject wearing the textile.

In a twenty-ninth embodiment of the fifth aspect, the textile fabric of any one of the first through twenty-eighth embodiments reduces the apparent temperature near the skin of a subject wearing the textile fabric by 0.5° C.-15° C.

In a seventh aspect, the invention provides a textile fabric that adsorbs water and other molecules.

In a first embodiment of the seventh aspect, the textile fabric is manufactured by a method comprising the steps of (a) providing a liquid or molten polymer (e.g., as in the case for a synthetic polymer such as a molten flowable polyester) or a liquid polymer solution (e.g., such as in the case of dissolved cellulose for producing regenerated cellulose fibers), (b) doping the liquid or molten polymer or liquid polymer solution with 0.5%-10% particles by weight, (c) forming a fiber from said particle-doped polymer, (d) removing a portion of the surface layer of the fiber to expose particles to the outside environment, and (e) weaving or knitting said fibers to produce a textile capable of adsorbing water vapor.

In a second embodiment of the seventh aspect, the fiber of the first embodiment has a cross-section aspect ratio of about 1-2.

In a third embodiment of the seventh aspect, particles of the first embodiment or the second embodiment are (a) present at a concentration of 250-20,000 parts per million, or (b) uniformly distributed throughout the cross section of the fiber out to and including the surface of the fiber.

In a fourth embodiment of the seventh aspect, the average diameter of the particles of any one of the first through third embodiments is 0.01-0.2 of the mean diameter of the fiber.

In a fifth embodiment of the seventh aspect, the particles of any one of the first through fourth embodiments can absorb at least 10% water by weight In a sixth embodiment of the seventh aspect, the polymer of any one of the first through fifth embodiments comprises a synthetic monomer.

In a seventh embodiment of the seventh aspect, the polymer of any one of the first through sixth embodiments comprises an ethylene terephthalate monomer.

In an eighth embodiment of the seventh aspect, the polymer of any one of the first through seventh embodiments comprises a polyester.

In a ninth embodiment of the seventh aspect, the fiber of any one of the first through eighth embodiments is formed by molten extrusion of the liquid or molten polymer.

In a tenth embodiment of the seventh aspect, the polymer any one of the first through fifth embodiments comprises a natural monomer.

In an eleventh embodiment of the seventh aspect, the polymer any one of the first through fifth and tenth embodiments comprises a D-glucose monomer.

In a twelfth embodiment of the seventh aspect, the polymer any one of the first through fifth and tenth through eleventh embodiments comprises cellulose.

In a thirteenth embodiment of the seventh aspect, the fiber any one of the first through fifth and tenth through twelfth embodiments is formed by wet spinning the liquid polymer solution.

In a fourteenth embodiment of the seventh aspect, the particles of any one of the first through thirteenth embodiments have an average diameter of 0.2 μm-50 μm.

In a fifteenth embodiment of the seventh aspect, the portion of the surface layer of the fiber that is removed in any one of the first through fourteenth embodiments has a thickness of about 0.1-10 times the average diameter of the particles.

In a sixteenth embodiment of the seventh aspect, the weight of the surface layer of the fiber that is removed in any one of the first through fifteenth embodiments is 5%-50% of the weight of the fiber before removing the layer.

In a seventeenth embodiment of the seventh aspect, the fiber of any one of the first through sixteenth embodiments is a staple fiber with an odor activity value (OAV) of at least 15.

In an eighteenth embodiment of the seventh aspect, the particles of any one of the first through seventeenth embodiments have a surface area greater than 10 square meters per gram.

In a nineteenth embodiment of the seventh aspect, the particles of any one of the first through eighteenth embodiments comprise zeolite.

In a twentieth embodiment of the seventh aspect, the particles of any one of the first through nineteenth embodiments comprise Activated carbon.

In a twenty-first embodiment of the seventh aspect, the particles of any one of the first through twentieth embodiments do not comprise silver or a silver ion.

In a twenty-second embodiment of the seventh aspect, the portion of surface layer of the fiber of any one of the first through twenty-first embodiments is removed by caustic reduction.

In a twenty-third embodiment of the seventh aspect, the portion of surface layer of the fiber of any one of the first through twenty-second embodiments is removed by treating the fiber with 5%-25% NaOH, LiOH, or KOH at about 80° C.-100° C. for about 15-45 minutes.

In a twenty-fourth embodiment of the seventh aspect, the portion of surface layer of the fiber of any one of the first through twenty-first embodiments is removed by enzymatic digestion.

In a twenty-fifth embodiment of the seventh aspect, the portion of surface layer of the fiber of any one of the first through twenty-first embodiments is removed by mercerization.

In a twenty-sixth embodiment of the seventh aspect, the portion of surface layer of the fiber of any one of the first through twenty-first embodiments is removed by laser etching.

In a twenty-seventh embodiment of the seventh aspect, the portion of surface layer of the fiber of any one of the first through twenty-first embodiments is removed by plasma etching.

In a twenty-eighth embodiment of the seventh aspect, the textile fabric of any one of the first through twenty-seventh embodiments adsorbs sufficient water vapor to reduce humidity near the skin of a subject wearing the textile.

In a twenty-ninth embodiment of the seventh aspect, the textile fabric of any one of the first through twenty-eighth embodiments reduces the apparent temperature near the skin of a subject wearing the textile fabric by 0.5° C.-15° C.

Example 1: Weight Reduction

Materials

75/48/1 filament polyester yarn made by Huvis Corporation (Seoul, KR) (DY820, 12/9/2014) doped with molecule-adsorbing zeolite particles was used as a test sample. The same spool of yarn was used for all specimens.

Experiment

Yarn specimens from the same spool of yarn were taken and treated with 10% w/w NaOH solution at 90° C. for different periods of time. The longer the treatment the more polyester is removed from the yarn. Dry weights of the yarn bundle were taken before and after treatment. The weight loss is presented in a percentage. It was desired to generate samples with 0%, 5%, 10%, and 50% weight loss. The actual amount of weight loss was determined for each specimen. Each specimen was tested for butane adsorbance and ash percentage. The butane adsorbance is a measure of the amount of additive surface area exposed. Higher values mean higher surface area exposure.

Results

Table 3 is a summary of the specimens produced, the actual weight reduction, the butane adsorbance value (OAV) and the percentage OAV changed.

TABLE 3

| Sample | Specimen | Target Weight Reduction | Weight Reduction | OAV | % Change in OAV |
|---|---|---|---|---|---|
| Control | a | 0 | 0.0% | 9 | |
| Control | b | 0 | 0.0% | 9 | |
| Control | c | 0 | 0.0% | 9 | |
| 5% Reduction | a | 5 | 6.9% | 16 | 78% |
| 5% Reduction | a | 5 | 6.9% | 17 | 89% |

TABLE 3-continued

| Sample | Specimen | Target Weight Reduction | Weight Reduction | OAV | % Change in OAV |
|---|---|---|---|---|---|
| 5% Reduction | b | 5 | 5.9% | 13 | 44% |
| 5% Reduction | c | 5 | 5.1% | 15 | 67% |
| 10% reduction | a | 10 | 12.5% | 32 | 256% |
| 10% reduction | b | 10 | 10.6% | 22 | 144% |
| 10% reduction | b | 10 | 10.6% | 20 | 122% |
| 10% reduction | b | 10 | 10.6% | 18 | 100% |
| 10% reduction | c | 10 | 12.1% | 29 | 222% |
| 50% reduction | a | 50 | 49.5% | 36 | 300% |
| 50% reduction | b | 50 | 58.1% | 25 | 178% |
| 50% reduction | c | 50 | 55.5% | 27 | 200% |

Referring to Table 5, the OAV values for all the samples are statistically different with a p<0.10 except for the difference between 10% and 50% weight reduced samples.

Figure 4:
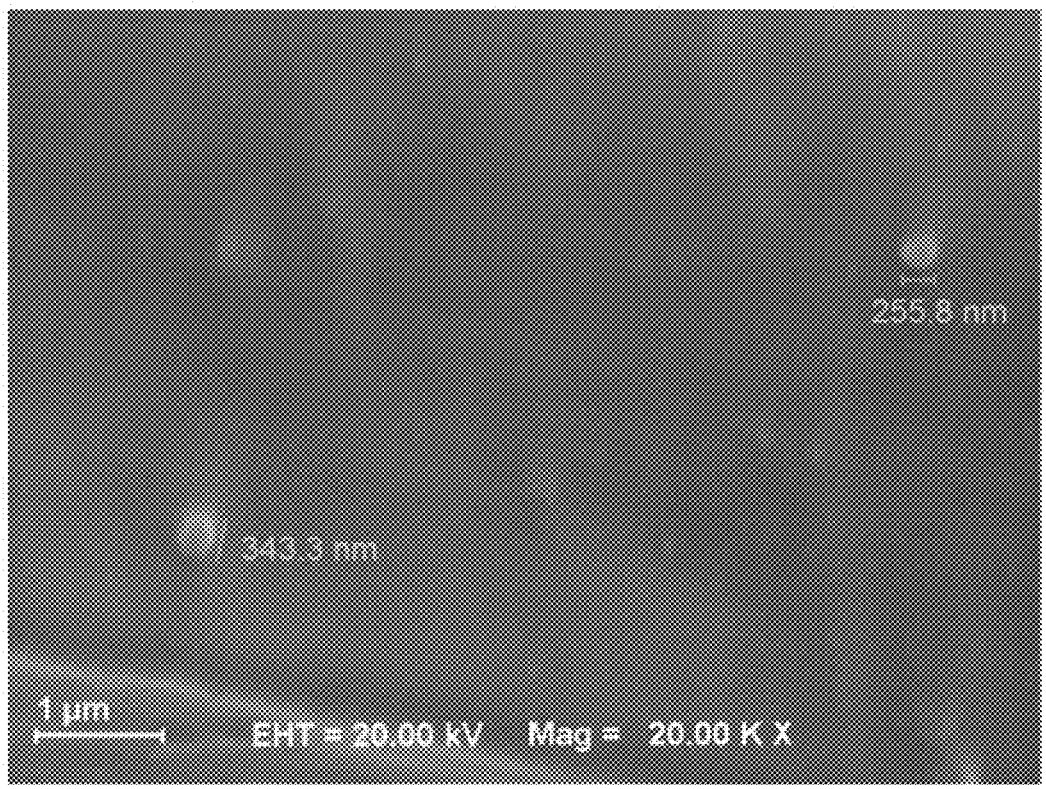
FIG. 4 is a scanning electron micrograph (SEM) showing a control fiber with no weight reduction.
Figure 5:
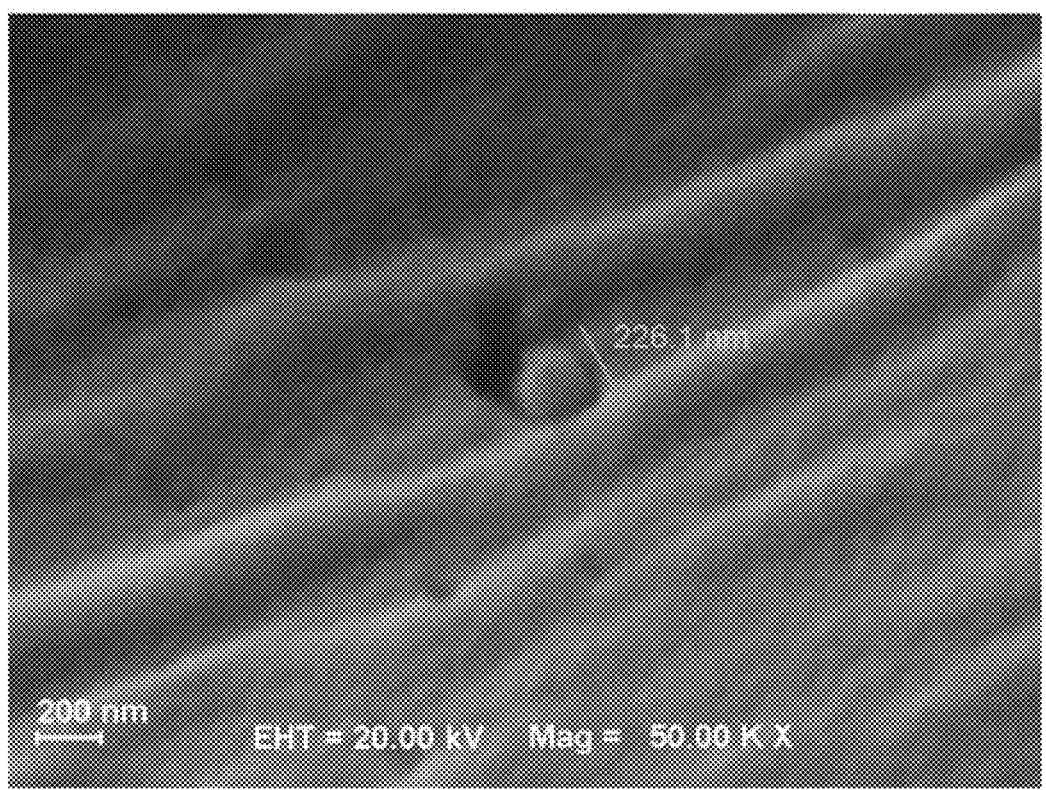
FIG. 5 is an SEM showing the surface of a fiber with 5% weight reduction.
Figure 6:
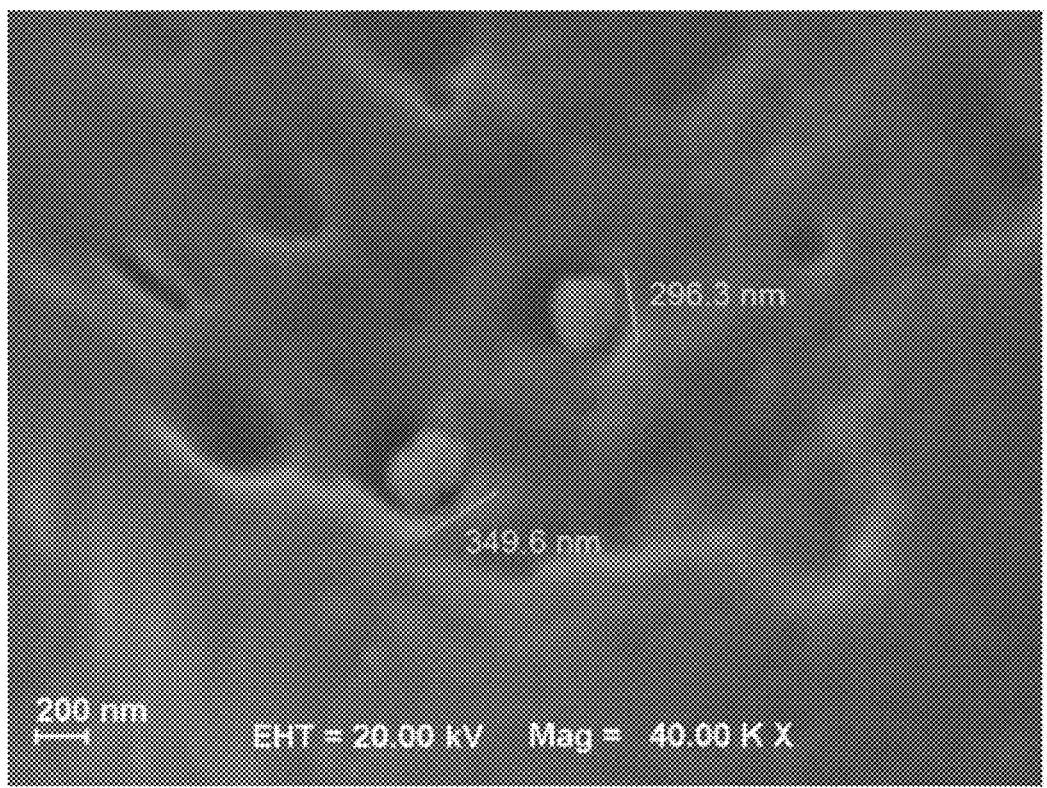
FIG. 6 is an SEM showing the surface of a fiber with 10% weight reduction.

SEM images of the surface of each different weight reduction filaments were collected and shown in FIGS. 4-7. FIG. 4 depicts an SEM of the control yarn. Note the surface of the yarn is smooth with an occasional particle being exposed. These particles are either the molecule-adsorbing particles or $TiO_2$. FIG. 5 depicts the 5% reduction sample. This sample has clear craters created by the removal of polyester. Note that craters can be formed around a particle, exposing more surface area of the particle. This is an enhancement to the yarn making the particles more effective which is measured by OAV. FIG. 6 depicts the 10% reduction sample. Notice the increase in craters formed and the rougher surface.

Figure 7:
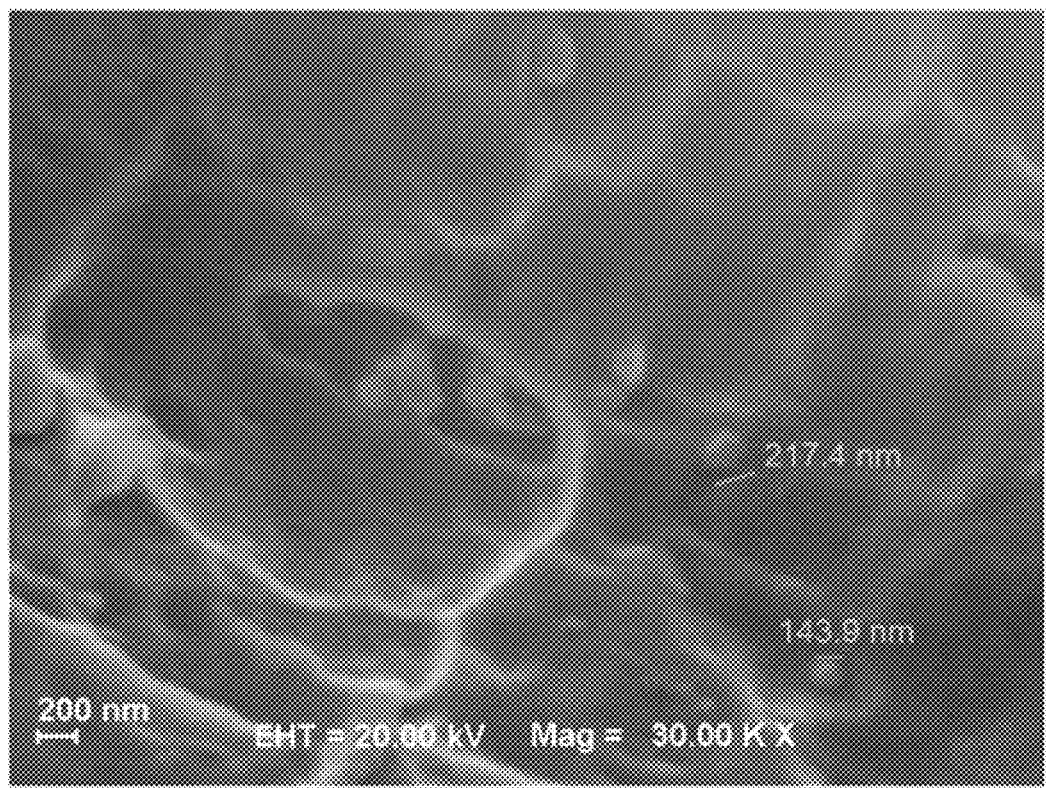
FIG. 7 is an SEM showing the surface of a fiber with 50% weight reduction.

FIG. 7 depicts the 50% weight reduction sample. The surface has become extremely rough, but the OAV value is not statistically larger. This could be either particles are being removed or not more extra particle surface is being exposed.

Conclusions

A NaOH weight reduction treatment exposes more molecule-adsorbing particle surface area as measured by OAV. This has a linear trend between 0% and 13% weight reduction, with 50% weight reduction not showing any OAV increase compared with 10% specimens in this example.

Example 2: Apparent Temperature Tests

Background

Human comfort is directly correlated to the perceived humidity and temperature next to the skin. Apparent Temperature measurements are one way to measure the effects of clothing on human perceived comfort. See Steadman, R. G.; "The Assessment of Sultriness. Part I: A Temperature-Humidity Index Based on Human Physiology and Clothing Science"; Journal of Applied Meteorology and Climatology; July 1979; 861. To accurately determine the impact of clothing on comfort, one should directly measure humidity and temperature next to skin (underneath clothing) rather than solely using fabric physical property testing. Fabric physical property tests such as AATCC 200 and 201 can be used to measure fabric characteristics, but care should be taken when using these tests to understand overall comfort. See Wojciechowska, I.; "Challenges in Moisture Management Testing"; AATCC Review; Vol. 18, No. 2, p. 31. Fabric property tests focus on one aspect of the fabric and thus need to be used in combination with several tests and field trials to understand the full impact a fabric has on comfort. Directly measuring humidity and temperature next to skin simulates real life situations better than fabric physical property testing and more accurately measures human comfort.

Previous studies measured the Apparent Temperature differences between various garment systems with and without the presence of fibers containing molecule-adsorbing particles. (Apparent Temperature is the effect of humidity on temperature predicting what a person "feels like" when wearing the test garment system.) These studies measured temperature and humidity beneath clothing in a controlled environment regulating the amount of work the test subject performed to create a humidity challenge. It has been found that the inclusion of weight-reduced fibers containing molecule-adsorbing particles reduces the Apparent Temperature build-up, leading to a wider comfort range for the test subject. In this example, two thobe test garments were used, one containing molecule-adsorbing particle-doped fibers and the other without the particles. Apparent Temperature was determined beneath each thobe with varying amounts of work to create heat within the controlled environment.

Samples

The two thobes were made from similar fabrics, except one fabric contained weight-reduced particle-doped fibers (the experimental fabric) and the other fabric contained weight-reduced fibers without particle doping (the control fabric). The fabrics in both thobes were similar in construction, weight, and air permeability.

The experimental thobe fabric was woven (115×94 count), contained 50% particle-doped polyester (weft), 40/1 45% polyester and 5% Tufcel (warp), 133 g/m², with 6% weight reduction.

The control thobe fabric was woven (115×94 count), contained 50% polyester (weft), 40/1 45% polyester and 5% Tufcel (warp), 139 g/m², with 6% weight reduction.

Testing

The testing was performed in a climate controlled room set to 28° C. and 30% relative humidity. The temperature, humidity, and work setting were selected so as to produce a humidity challenge without producing excessive liquid sweat production. This allows one to test the performance of the sweat vapor challenge on the garments. A single subject was used during the testing of both systems.

The user wore both thobes over the same light-weight mesh shirt. 14 sensors were mounted on the back of this shirt and then the thobe was worn over the shirt and sensors. The subject equilibrated to the room conditions for 30 minutes before testing, then the sensors started recording temperature and humidity for 60 minutes.

The subject rested for 5 minutes, pedaled for 10 minutes at 80 watts of output, rested for 10 minutes, pedaled for 10 minutes at 90 watts of output, rested 10 minutes, pedaled for 10 minutes at 100 watts output, and then finally rested for 5 minutes. Between the morning and afternoon trials the subject rested for 2 hours.

Figure 8:
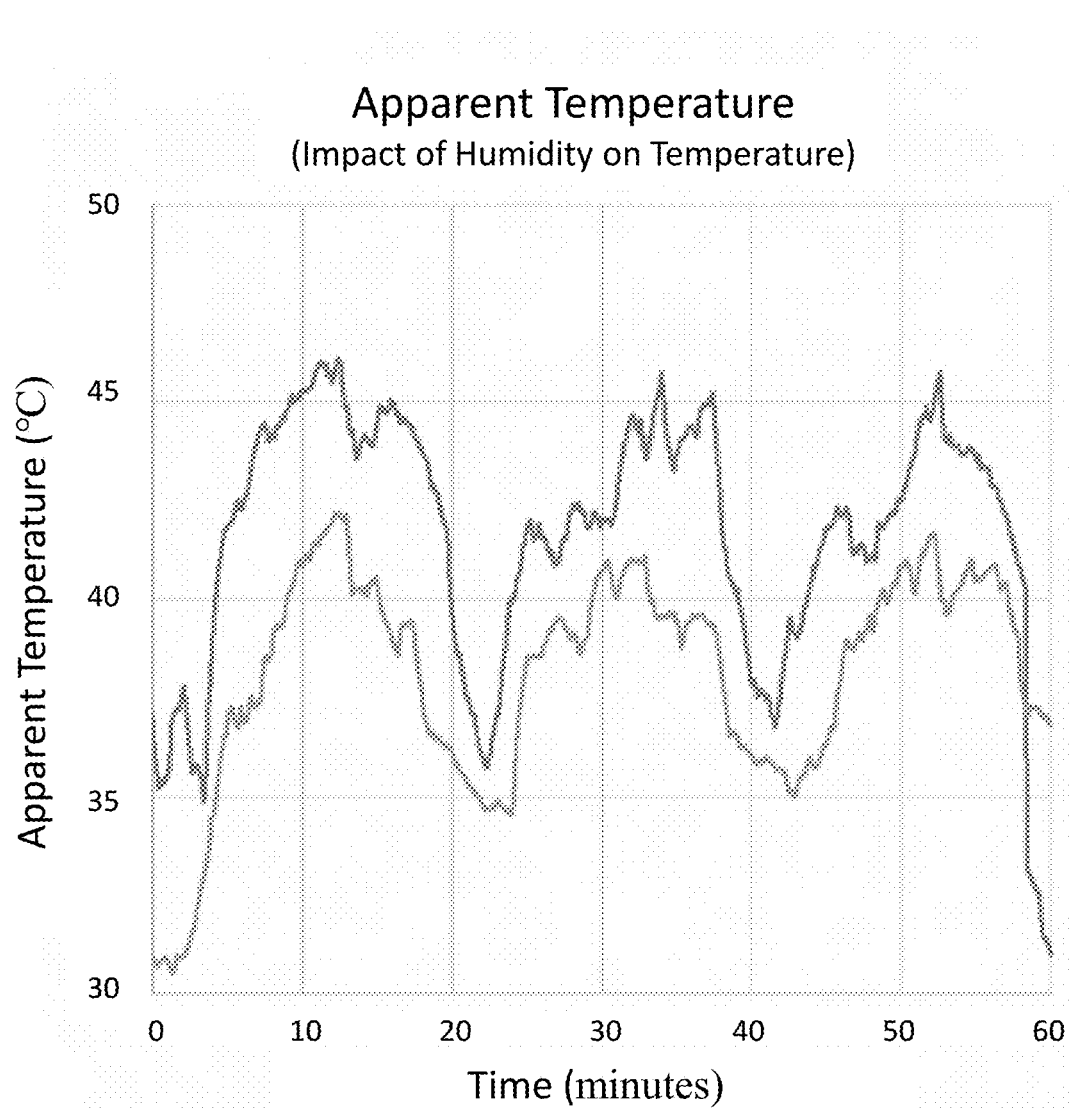
FIG. 8 is a line graph showing apparent temperature as a function of time for garments with particle-doped fibers (blue line) and garments with control fibers (gray line).

It has been found that humidity production of testers varies based on time of day due to the human circadian rhythm. To account for changes in humidity production throughout the day, testing was performed at the same time over two days. The data presented in FIG. 8 is an average of the sensors for a given system tested in the morning and afternoon.

Results

The Apparent Temperature scale was originally created to help alert people to potential heat induced health issues. Apparent Temperature can also be used to understand the impact of both humidity and temperature beneath clothing. This is because the calculation takes into account the cooling from sweat evaporation and the impact of humidity on evaporation. The calculation determines a "feels like" temperature so that people easily relate to the scale.

Sensors measuring temperature and humidity beneath the thobe were collected for both thobe test cases. FIG. 8 is the average Apparent Temperature over the 60-minute test for the experimental and control thobes. The experimental thobe (with molecule-adsorbing particles) always felt cooler compared to the control thobe (without molecule-adsorbing particles). It felt as much as 6.9° C. cooler with a mean difference of 3.7° C. and was cooler by >5.0° C. for 24% of the test. Note that at the 58-minute mark, the tester took the control thobe off, so at that point the temperature and humidity dropped. Values at that moment in time were excluded from the analysis.

Further, the tester started to produce liquid sweat at the 12-minute mark when wearing the control thobe. (Notably, when wearing the experimental thobe, liquid sweat was not detected over the entire 60-minutes of testing.) Wetness on the sensor disrupts the reading; these sensors are made to measure humidity and not liquid water. Wet sensors add to the "noise" in the measurement and are not accurately measuring the microclimate. Thus, sensors where wetness was determined were excluded from both sets of data.

Conclusions

Temperature and humidity were measured within the microclimate of a test subject under thobes. Apparent Temperature was calculated for systems with (experimental) and without (control) the particle-doped yarns. The experimental thobe was cooler relative to the control thobe by up to 6.9° C. and had a mean difference of 3.7° C. when heat was produced through regulated work. Furthermore, the experimental thobe was cooler relative to thobes made from fibers containing molecular-adsorbing particles but without weight reduction (second control). The second control thobes were about a 1° C. cooler than the control thobes. Thus, weight reduction provides a additional significant advantage in relative cooling and/or thermal management. The experimental thobe greatly improved user perceived comfort and prevented the test subject from producing liquid sweat, whereas the user started to produce liquid sweat at the 12-minute mark in the control thobe.

One of skill in the art will understand that the features and embodiments of the present invention, as well as of the steps of the methods of the present invention, may be used together to create further embodiments of the present invention. While the invention has been described in detail in connection with specific embodiments, it should be understood that the invention is not limited to the above-disclosed embodiments. Rather, a person skilled in the art will understand that the invention can be modified to incorporate any number of variations, alternations, substitutions, or equivalent arrangements not heretofore described, but which are commensurate with the spirit and scope of the invention. Specific embodiments should be taken as exemplary and not limiting.

What is claimed is:

1. A method for making a fiber, said method comprising:
    doping a liquid polymer with encapsulated zeolite particles, wherein the zeolite particles comprise a mean particle diameter between 0.2 and 50 microns, inclusive, and wherein the zeolite particles are present in the fiber at a concentration of 250-25,000 parts per million;
    forming a fiber from said particle-doped polymer; and
    removing a portion of the surface layer of the fiber by treating the fiber with 5-25% by weight of NaOH, LiOH, or KOH at about 80° C.-100° C. for about 15-45 minutes to form a reduced fiber, wherein the portion of the surface layer of the fiber that is removed has a thickness of about 0.1-10 times the mean diameter of the zeolite particles, and wherein the reduced fiber has an odor adsorbance or activity value (OAV) of at least 15.

2. The method of claim 1, wherein the encapsulant comprises an organic solvent.

3. The method of claim 1, wherein the zeolite particles were encapsulated by mixing in a slurry with the encapsulant.

4. The method of claim 1, wherein the OAV is determined using ASTM D5228.

5. The method of claim 1, wherein the ash content of the reduced fiber is 0.5 to 5 percent by weight.

6. The method of claim 1, wherein the polymer comprises synthetic monomers.

7. The method of claim 6, wherein the synthetic monomers comprise a polyester.

8. The method of claim 7, wherein the fiber is formed by molten extrusion.

* * * * *